United States Patent
Lee et al.

(10) Patent No.: US 8,274,666 B2
(45) Date of Patent: *Sep. 25, 2012

(54) PROJECTOR/PRINTER FOR DISPLAYING OR PRINTING OF DOCUMENTS

(75) Inventors: Dar-Shyang Lee, Union City, CA (US); Jonathan J. Hull, San Carlos, CA (US); Berna Erol, Cupertino, CA (US); Jamey Graham, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 1238 days.

This patent is subject to a terminal disclaimer.

(21) Appl. No.: 11/094,887

(22) Filed: Mar. 30, 2005

(65) Prior Publication Data
US 2005/0231739 A1    Oct. 20, 2005

Related U.S. Application Data

(63) Continuation-in-part of application No. 10/814,580, filed on Mar. 30, 2004, now Pat. No. 7,440,126, and a continuation-in-part of application No. 10/814,842, filed on Mar. 30, 2004, now Pat. No. 7,864,352.

(51) Int. Cl.
*G06F 3/12* (2006.01)
*G06F 15/00* (2006.01)
*G06F 21/00* (2006.01)
*G06F 17/00* (2006.01)
*G06T 15/00* (2011.01)
*G06T 17/00* (2006.01)
*G09G 3/36* (2006.01)

(52) U.S. Cl. ......... 358/1.13; 358/1.1; 358/1.9; 345/419; 345/100; 345/428; 705/52; 705/51; 715/202

(58) Field of Classification Search .................. 358/1.9, 358/1.13, 1.1, 518; 382/167; 345/100, 2.2, 345/419; 705/52, 51; 709/217, 206
See application file for complete search history.

(56) References Cited

U.S. PATENT DOCUMENTS
4,133,007 A    1/1979    Wessler et al.
(Continued)

FOREIGN PATENT DOCUMENTS
CA    2386829    11/2002
(Continued)

OTHER PUBLICATIONS
Chinese Application No. 2004100849823 Office Action, Jun. 1, 2007, 24 pages.
(Continued)

*Primary Examiner* — Akwasi M Sarpong
(74) *Attorney, Agent, or Firm* — Patent Law Works LLP

(57) ABSTRACT

A combined projector/printer that can receive data in a printer format or a projector format, and then either generate a displayable image, a printed document or both. In the case that the input data is not in a video format but rather in a print format, the projector system is further capable of converting the print format data to image data and to render the image data on a digital display. The print format to image data conversion is provided by a coder/decoder. The combined projector/printer system is capable of displaying an image, printing an image, or recording a presentation according to the needs of the user. The present invention also includes a variety of methods for performing the functionality of the present invention including a "print-to-display" method.

15 Claims, 18 Drawing Sheets

U.S. PATENT DOCUMENTS

| | | |
|---|---|---|
| 4,205,780 A | 6/1980 | Burns et al. |
| 4,437,378 A | 3/1984 | Ishida et al. |
| 4,619,522 A | 10/1986 | Imai |
| 4,635,132 A | 1/1987 | Nakamura |
| 4,703,366 A | 10/1987 | Kobori et al. |
| 4,734,898 A | 3/1988 | Morinaga |
| 4,754,485 A | 6/1988 | Klatt |
| 4,807,186 A | 2/1989 | Ohnishi et al. |
| 4,831,610 A | 5/1989 | Hoda et al. |
| 4,881,135 A | 11/1989 | Heilweil |
| 4,907,973 A | 3/1990 | Hon |
| 4,998,215 A | 3/1991 | Black et al. |
| 5,010,498 A | 4/1991 | Miyata |
| 5,059,126 A | 10/1991 | Kimball |
| 5,091,948 A | 2/1992 | Kametani |
| 5,093,730 A | 3/1992 | Ishii et al. |
| 5,111,285 A | 5/1992 | Fujita et al. |
| 5,115,967 A | 5/1992 | Wedekind |
| 5,136,563 A | 8/1992 | Takemasa et al. |
| 5,170,935 A | 12/1992 | Federspiel et al. |
| 5,220,649 A | 6/1993 | Forcier |
| 5,231,698 A | 7/1993 | Forcier |
| 5,237,648 A | 8/1993 | Mills et al. |
| 5,270,989 A | 12/1993 | Kimura |
| 5,343,251 A | 8/1994 | Nafeh |
| 5,386,510 A | 1/1995 | Jacobs |
| 5,428,555 A | 6/1995 | Starkey et al. |
| 5,432,532 A | 7/1995 | Mochimaru et al. |
| 5,436,792 A | 7/1995 | Leman et al. |
| 5,438,426 A | 8/1995 | Miake et al. |
| 5,444,476 A | 8/1995 | Conway |
| 5,479,600 A | 12/1995 | Wroblewski et al. |
| 5,480,306 A | 1/1996 | Liu |
| 5,485,554 A | 1/1996 | Lowitz et al. |
| 5,488,423 A | 1/1996 | Walkingshaw et al. |
| 5,493,409 A | 2/1996 | Maeda et al. |
| 5,524,085 A | 6/1996 | Bellucco et al. |
| 5,566,271 A | 10/1996 | Tomitsuka et al. |
| 5,568,406 A | 10/1996 | Gerber |
| 5,572,651 A | 11/1996 | Weber et al. |
| 5,576,950 A | 11/1996 | Tonomura et al. |
| 5,581,366 A | 12/1996 | Merchant et al. |
| 5,590,257 A | 12/1996 | Forcier |
| 5,596,698 A | 1/1997 | Morgan |
| 5,617,138 A | 4/1997 | Ito et al. |
| 5,624,265 A | 4/1997 | Redford et al. |
| 5,627,936 A | 5/1997 | Prasad et al. |
| 5,628,684 A | 5/1997 | Bouedec |
| 5,633,723 A | 5/1997 | Sugiyama et al. |
| 5,640,193 A | 6/1997 | Wellner |
| 5,661,506 A | 8/1997 | Lazzouni et al. |
| 5,661,783 A | 8/1997 | Assis |
| 5,682,330 A | 10/1997 | Seaman et al. |
| 5,682,540 A | 10/1997 | Klotz, Jr. et al. |
| 5,690,496 A | 11/1997 | Kennedy |
| 5,706,097 A | 1/1998 | Schelling et al. |
| 5,717,841 A | 2/1998 | Farrell et al. |
| 5,721,883 A | 2/1998 | Katsuo et al. |
| 5,729,665 A | 3/1998 | Gauthier |
| 5,749,735 A | 5/1998 | Redford et al. |
| 5,757,897 A | 5/1998 | LaBarbera et al. |
| 5,761,380 A | 6/1998 | Lewis et al. |
| 5,764,235 A * | 6/1998 | Hunt et al. .................. 345/428 |
| 5,764,368 A | 6/1998 | Shibaki et al. |
| 5,774,260 A | 6/1998 | Petitto et al. |
| 5,793,869 A | 8/1998 | Claflin, Jr. |
| 5,804,803 A | 9/1998 | Cragun et al. |
| 5,845,144 A | 12/1998 | Tateyama et al. |
| 5,877,764 A | 3/1999 | Feitelson et al. |
| 5,884,056 A | 3/1999 | Steele |
| 5,903,538 A | 5/1999 | Fujita et al. |
| 5,936,542 A | 8/1999 | Kleinrock et al. |
| 5,938,727 A | 8/1999 | Ikeda |
| 5,940,776 A | 8/1999 | Baron et al. |
| 5,941,936 A | 8/1999 | Taylor |
| 5,945,998 A | 8/1999 | Eick |
| 5,949,879 A | 9/1999 | Berson et al. |
| 5,962,839 A | 10/1999 | Eskildsen |
| 5,974,189 A | 10/1999 | Nicponski |
| 5,987,226 A | 11/1999 | Ishikawa et al. |
| 5,995,553 A | 11/1999 | Crandall et al. |
| 5,999,173 A | 12/1999 | Ubillos |
| 6,000,030 A | 12/1999 | Steinberg et al. |
| 6,006,241 A | 12/1999 | Purnaveja et al. |
| 6,020,916 A | 2/2000 | Gersberg et al. |
| 6,038,567 A | 3/2000 | Young |
| 6,043,904 A | 3/2000 | Nickerson |
| 6,046,718 A * | 4/2000 | Suzuki et al. .................. 345/100 |
| 6,076,733 A | 6/2000 | Wilz, Sr. et al. |
| 6,076,734 A | 6/2000 | Dougherty et al. |
| 6,081,261 A | 6/2000 | Wolff et al. |
| 6,098,106 A | 8/2000 | Philyaw et al. |
| 6,106,457 A | 8/2000 | Perkins et al. |
| 6,108,656 A | 8/2000 | Durst et al. |
| 6,111,567 A | 8/2000 | Savchenko et al. |
| 6,115,718 A | 9/2000 | Huberman et al. |
| 6,118,888 A | 9/2000 | Chino et al. |
| 6,123,258 A | 9/2000 | Iida |
| 6,125,229 A | 9/2000 | Dimitrova et al. |
| 6,138,151 A | 10/2000 | Reber et al. |
| 6,141,001 A | 10/2000 | Baleh |
| 6,148,094 A | 11/2000 | Kinsella |
| 6,152,369 A | 11/2000 | Wilz, Sr. et al. |
| 6,153,667 A | 11/2000 | Howald |
| 6,167,033 A | 12/2000 | Chang et al. |
| 6,170,007 B1 | 1/2001 | Venkatraman et al. |
| 6,175,489 B1 | 1/2001 | Markow et al. |
| 6,189,009 B1 | 2/2001 | Stratigos et al. |
| 6,193,658 B1 | 2/2001 | Wendelken et al. |
| 6,195,068 B1 * | 2/2001 | Suzuki et al. .................. 345/2.2 |
| 6,199,042 B1 | 3/2001 | Kurzweil |
| 6,230,189 B1 * | 5/2001 | Sato et al. .................. 709/206 |
| 6,256,638 B1 | 7/2001 | Dougherty et al. |
| 6,266,053 B1 | 7/2001 | French et al. |
| 6,296,693 B1 | 10/2001 | McCarthy |
| 6,297,812 B1 | 10/2001 | Ohara et al. |
| 6,297,851 B1 | 10/2001 | Taubman et al. |
| 6,298,145 B1 | 10/2001 | Zhang et al. |
| 6,301,586 B1 | 10/2001 | Yang et al. |
| 6,302,527 B1 | 10/2001 | Walker |
| 6,307,956 B1 | 10/2001 | Black |
| 6,308,887 B1 | 10/2001 | Korman et al. |
| 6,330,976 B1 | 12/2001 | Dymetman et al. |
| 6,360,057 B1 | 3/2002 | Tsumagari et al. |
| 6,369,811 B1 | 4/2002 | Graham et al. |
| 6,373,498 B1 | 4/2002 | Abgrall |
| 6,373,585 B1 | 4/2002 | Mastie et al. |
| 6,375,298 B2 | 4/2002 | Purcell et al. |
| 6,378,070 B1 | 4/2002 | Chan et al. |
| 6,381,614 B1 | 4/2002 | Barnett et al. |
| 6,396,594 B1 | 5/2002 | French et al. |
| 6,400,996 B1 | 6/2002 | Hoffberg et al. |
| 6,417,435 B2 | 7/2002 | Chantzis et al. |
| 6,421,738 B1 | 7/2002 | Ratan et al. |
| 6,439,465 B1 | 8/2002 | Bloomberg |
| 6,442,336 B1 | 8/2002 | Lemelson |
| 6,452,615 B1 | 9/2002 | Chiu et al. |
| 6,466,534 B2 | 10/2002 | Cundiff, Sr. |
| 6,476,793 B1 | 11/2002 | Motoyama et al. |
| 6,476,834 B1 | 11/2002 | Doval et al. |
| 6,502,114 B1 | 12/2002 | Forcier |
| D468,277 S | 1/2003 | Sugiyama |
| 6,502,756 B1 | 1/2003 | Fåhraeus |
| 6,504,620 B1 | 1/2003 | Kinjo |
| 6,515,756 B1 | 2/2003 | Mastie et al. |
| 6,519,360 B1 | 2/2003 | Tanaka |
| 6,529,920 B1 | 3/2003 | Arons et al. |
| 6,535,639 B1 | 3/2003 | Uchihachi et al. |
| 6,544,294 B1 | 4/2003 | Greenfield et al. |
| 6,552,743 B1 | 4/2003 | Rissman |
| 6,556,241 B1 | 4/2003 | Yoshimura et al. |
| 6,568,595 B1 | 5/2003 | Russell et al. |
| 6,581,070 B1 | 6/2003 | Gibbon et al. |
| 6,587,859 B2 | 7/2003 | Dougherty et al. |
| 6,593,860 B2 | 7/2003 | Lai et al. |
| 6,594,377 B1 | 7/2003 | Kim et al. |
| 6,611,276 B1 | 8/2003 | Muratori et al. |

| Patent/Pub No. | Date | Name |
|---|---|---|
| 6,611,622 B1 | 8/2003 | Krumm |
| 6,611,628 B1 | 8/2003 | Sekiguchi et al. |
| 6,625,334 B1 | 9/2003 | Shiota et al. |
| 6,647,534 B1 | 11/2003 | Graham |
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,011 B1 | 3/2004 | Nakajima |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,073,119 B2 | 7/2006 | Matsubayashi et al. |
| 7,075,676 B2 | 7/2006 | Owen |
| 7,079,278 B2 | 7/2006 | Sato |
| 7,089,156 B2 * | 8/2006 | Takayasu et al. ............... 702/186 |
| 7,089,420 B1 | 8/2006 | Durst et al. |
| 7,092,568 B2 | 8/2006 | Eaton |
| 7,131,058 B1 | 10/2006 | Lapstun |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,225,158 B2 * | 5/2007 | Toshikage et al. ............... 705/51 |
| 7,228,492 B1 | 6/2007 | Graham |
| 7,260,828 B2 | 8/2007 | Aratani et al. |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 7,305,620 B1 * | 12/2007 | Nakajima et al. ............... 358/1.1 |
| 7,313,808 B1 | 12/2007 | Gupta et al. |
| 7,363,580 B2 | 4/2008 | Tabata et al. |
| 7,647,555 B1 | 1/2010 | Wilcox et al. |
| 2001/0003846 A1 | 6/2001 | Rowe et al. |
| 2001/0017714 A1 | 8/2001 | Komatsu et al. |
| 2001/0020954 A1 | 9/2001 | Hull et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0019982 A1 | 2/2002 | Aratani et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101343 A1 | 8/2002 | Patton |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0046241 A1 * | 3/2003 | Toshikage et al. ............... 705/52 |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0086720 A1 | 5/2003 | Song |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0146927 A1 | 8/2003 | Crow et al. |
| 2003/0160898 A1 | 8/2003 | Baek et al. |
| 2003/0164898 A1 | 9/2003 | Imai |
| 2003/0177240 A1 | 9/2003 | Gulko et al. |
| 2003/0187642 A1 | 10/2003 | Ponceleon et al. |
| 2003/0218597 A1 | 11/2003 | Hodzic |
| 2003/0220988 A1 | 11/2003 | Hymel |
| 2003/0231198 A1 | 12/2003 | Janevski |
| 2004/0024643 A1 | 2/2004 | Pollock et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0064207 A1 | 4/2004 | Zacks et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engelson et al. |
| 2004/0143602 A1 | 7/2004 | Ruiz et al. |
| 2004/0150627 A1 | 8/2004 | Luman et al. |
| 2004/0156616 A1 | 8/2004 | Strub et al. |
| 2004/0167895 A1 | 8/2004 | Carro |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0240562 A1 | 12/2004 | Bargeron et al. |
| 2004/0249650 A1 | 12/2004 | Freedman et al. |

| | | | |
|---|---|---|---|
| 2005/0038794 | A1 | 2/2005 | Piersol |
| 2005/0064935 | A1 | 3/2005 | Blanco |
| 2005/0068569 | A1 | 3/2005 | Hull et al. |
| 2005/0068581 | A1 | 3/2005 | Hull et al. |
| 2005/0083413 | A1 | 4/2005 | Reed et al. |
| 2005/0125717 | A1 | 6/2005 | Segal et al. |
| 2005/0149849 | A1 | 7/2005 | Graham et al. |
| 2005/0213153 | A1 | 9/2005 | Hull et al. |
| 2005/0216838 | A1 | 9/2005 | Graham |
| 2005/0216852 | A1 | 9/2005 | Hull et al. |
| 2005/0223309 | A1* | 10/2005 | Lee et al. ............ 715/500.1 |
| 2005/0225781 | A1* | 10/2005 | Koizumi ................ 358/1.9 |
| 2005/0262437 | A1 | 11/2005 | Patterson et al. |
| 2006/0013478 | A1* | 1/2006 | Ito et al. ................. 382/167 |
| 2006/0043193 | A1 | 3/2006 | Brock |
| 2006/0092450 | A1* | 5/2006 | Kanazawa et al. ...... 358/1.13 |
| 2006/0136343 | A1 | 6/2006 | Coley et al. |
| 2006/0171559 | A1 | 8/2006 | Rhoads |
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0234196 | A1 | 10/2007 | Nicol et al. |
| 2007/0268164 | A1 | 11/2007 | Lai et al. |
| 2008/0037043 | A1 | 2/2008 | Hull et al. |
| 2008/0246757 | A1* | 10/2008 | Ito ........................... 345/419 |

FOREIGN PATENT DOCUMENTS

| | | |
|---|---|---|
| CN | 1352765 A | 6/2002 |
| CN | 1097394 C | 12/2002 |
| EP | 0651556 | 5/1995 |
| EP | 0743613 | 11/1996 |
| EP | 1079313 A2 | 2/2001 |
| EP | 1133170 A2 | 9/2001 |
| JP | 60-046653 | 3/1985 |
| JP | 01-172900 | 7/1989 |
| JP | 04-225670 | 8/1992 |
| JP | 05-101484 | 4/1993 |
| JP | 06-124502 | 5/1994 |
| JP | 07-160445 | 6/1995 |
| JP | H07-284033 | 10/1995 |
| JP | 08-002015 | 1/1996 |
| JP | 08-69419 | 3/1996 |
| JP | 08-160985 | 6/1996 |
| JP | H09-037180 | 2/1997 |
| JP | H10-049761 | 2/1998 |
| JP | 10-126723 | 5/1998 |
| JP | H11-341423 | 12/1999 |
| JP | 2000190575 | 7/2000 |
| JP | 2000352995 | 12/2000 |
| JP | 2001-228994 | 8/2001 |
| JP | 2001324988 | 11/2001 |
| JP | 2002178565 | 6/2002 |
| JP | 2002344636 | 11/2002 |
| JP | 2003005790 | 1/2003 |
| JP | 2003-87458 | 3/2003 |
| JP | 2003-513564 | 4/2003 |
| JP | 2003-514318 | 4/2003 |
| JP | 2003-177776 | 6/2003 |
| WO | WO9806098 | 2/1998 |
| WO | WO 99/18523 | 4/1999 |
| WO | WO0073875 | 12/2000 |
| WO | WO 02/082316 A1 | 10/2002 |

OTHER PUBLICATIONS

Chinese Application No. 2004100897988 Office Action, Apr. 6, 2007, 8 pages.
U.S. Appl. No. 10/814,842, filed Mar. 30, 2004, Hull et al.
U.S. Appl. No. 10/814,580, filed Mar. 30, 2004, Peirsol et al.
U.S. Appl. No. 10/660,867, filed Sep. 12, 2003, Erol et al.
Brown et al., "A Diary Study of Information Capture in Working Life," Proceedings of ACM CHI 2000 Conference on Human Factors in Computing Systems, 2000, pp. 438-445, vol. 1.
Erol, Berna et al., "Linking Multimedia Presentations With Their Symbolic Source Documents: Algorithm and Applications," ACM Multimedia '03, Nov. 2-8, 2003, pp. 498-507, Berkeley, CA.
Erol, Berna et al., "Prescient Paper: Multimedia Document Creation With Document Image Matching," 17th International Conference on Pattern Recognition, Aug. 2004, 4 pages, Cambridge, U.K.
Erol, Berna et al, "Retrieval of Presentation Recordings With Digital Camera Images," IEE Conference on Computer Vision and Pattern Recognition (CVPR), Jun. 27-Jul. 2, 2004, 2 pages, Washington, D.C.
Hardman, L. et al., "Integrating the Amsterdam Hypermedia Model with the Standard Reference Model for Intelligent Multimedia Presentation Systems," Computer Standards & Interfaces, 1997, pp. 497-507, vol. 18.
Karasik, D. "Image Processing in Perl Graphic Applications," Google, Apr. 2, 2003, pp. 1-12.
Lauesen, S., "User Interface Design: A Software Engineering Perspective," 2005, 28 pages.
Lienhart, Rainer et al., "Localizing and Segmenting Text in Images and Videos," IEEE Transactions on Circuits and Systems for Video Technology, Apr. 2002, pp. 256-268, vol. 12, No. 4.
"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.
Otsu, N., "A Threshold Selection method From Gray-Level Histograms," IEEE Transactions on Systems, Man and Cybernetics, Jan. 1979, pp. 62-66, vol. SMC-9, No. 1.
Srihari, S.N. et al., "Name and Address Block Reader System for Tax Form Processing," IEEE, 1995, pp. 5-10.
U.S. Appl. No. 10/814,932, filed Mar. 30, 2004.
U.S. Appl. No. 10/814,751, filed Mar. 30, 2004.
U.S. Appl. No. 10/813,847, filed Mar. 30, 2004.
U.S. Appl. No. 10/814,931, filed Mar. 30, 2004.
U.S. Appl. No. 10/814,948, filed Mar. 30, 2004.
U.S. Appl. No. 10/814,386, filed Mar. 30, 2004.
U.S. Appl. No. 10/814,700, filed Mar. 30, 2004.
U.S. Appl. No. 10/814,500, filed Mar. 30, 2004.
U.S. Appl. No. 10/814,845, filed Mar. 30, 2004.
U.S. Appl. No. 09/714,785, filed Nov. 15, 2000.
Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).
Boreczky, J. et al., "An Interactive Comic Book Presentation for Exploring Video," CHI Letters, Apr. 1-6, 2000, pp. 185-192, vol. 2, Issue 1.
Buchanan, M.C. et al., "Multimedia Documents as User Interfaces," INTERCHI '93, Amsterdam, The Netherlands, Apr. 24-29, 1993, pp. 527-528.
Harada, K. et al., "Anecdote: A Multimedia Storyboarding System with Seamless Authoring Support," ACM Multimedia '96, Boston, MA, 1996, pp. 341-351.
Mackay, W. et al., "Augmenting Reality: Adding Computational Dimensions to Paper," Communications of the ACM, Jul. 1993, pp. 96-97, vol. 36, No. 7.
Mackay, W. et al., "Video Mosaic: Laying Out Time in a Physical Space," Multimedia '94, San Francisco, CA, Oct. 1994, pp. 165-172.
Makedon, F. et al., "Multimedia Authoring, Development Environments and Digital Video Editing," Dartmouth College Technical Report, PCS-TR94-231, 2001, pp. 1-24.
Nelson, L. et al, "Palette: A Paper Interface for Giving Presentations," CHI '99, May 1999, pp. 1-8.
Roschelle, J. et al., "VideoNoter: A Productivity Tool for Video Data Analysis," Behavior Research Methods, Instruments & Computers, 1991, pp. 219-224, vol. 23, No. 2.
Tonomura, Y. et al., "VideMAP and VideoSpaceIcon," INTERCHI '93, Amsterdam, The Netherlands, Apr. 24-29, 1993, pp. 131-136 and 544.
Wellner, P., "Interacting with Paper on the DigitalDesk," Communications of the ACM, Jul. 1993, pp. 87-96, vol. 36, No. 7.
Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.
Hecht, D.L., "Printed Embedded Data Graphical User Interfaces," Computer, Mar. 2001, pp. 47-55, vol. 34, Issue 3.
Klemmer, S.R. et al., "Books with Voices: Paper Transcripts as a Tangible Interface to Oral Histories," CHI 2003, Fort Lauderdale, FL, Apr. 5-10, 2003, pp. 89-96.
Gropp, W. et al., "Using MPI-Portable Programming with the Message Passing Interface," copyright 1999, pp. 35-42, second edition, MIT Press.
Japanese Office Action, Japanese Application No. 2004-278346, Feb. 16, 2010, 2 pages.
Japanese Office Action, Japanese Application No. 2004-278349, Feb. 2, 2010, 2 pages.
Tonomura, Y. et al., "Structured Video Computing," IEEE Multimedia, Sep. 1994, pp. 34-43, vol. 1, Issue 3.
Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.
Shelbourn, M., et al., "Multimedia in Construction Education: New Dimensions," Automation in Construction, 2001, pp. 265-274, vol. 10, Elsevier.
Communication Pursuant to Article 96(2) EPC, European Application No. 04255836.1, Jun. 11, 2007, 10 pages.
Stifelman, L. et al., "The Audio Notebook," SIGCHI 2001, Mar. 31-Apr. 5, 2001, pp. 182-189, vol. 3, No. 1, Seattle, WA.
Japanese Office Action, Japanese Application No. 2004-278353, Aug. 11, 2009, 3 pages.
Poon, K.M. et al., "Performance Analysis of Median Filtering on Meiko™—A Distributed Multiprocessor System," IEEE First International Conference on Algorithms and Architectures for Parallel Processing, 1995, pp. 631-639.
ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.
Configuring a Printer (NT), Oxford Computer Support [online] [Retrieved on Nov. 13, 2003] Retrieved from the Internet<URL: http://www.nox.ac.uk/cehoxford/ccs/facilities/printers/configint.htm>.
"DocumentMall Secure Document Management" [online] [Retrieved on Mar. 9, 2004). Retrieved from the Internet <URL:http://www.documentmall.com>.
Gopal, S. et al., "Load Balancing in a Heterogeneous Computing Environment," Proceedings of the Thirty-First Hawaii International Conference on System Sciences, Jan. 6-9, 1998.
Girgensohn, Andreas et al., "Time-Constrained Keyframe Selection Technique," Multimedia Tools and Applications (2000), vol. 11, pp. 347-358.
Graham, Jamey et al., "A Paper-Based Interface for Video Browsing and Retrieval," IEEE International Conference on Multimedia and Expo (Jul. 6-9, 2003), vol. 2, P:II 749-752.
Graham, Jamey et al., "The Video Paper Multimedia Playback System," Proceedings of the 11$^{th}$ ACM International Conference on Multimedia (Nov. 2003), pp. 94-95.
Graham, Jamey et al., "The Video Paper: A Paper-Based Interface for Skimming and Watching Video," International Conference on Consumer Electronics (Jun. 16-18, 2002), pp. 214-215.
Gropp, W. et al., "Using MPI—Portable Programming with the Message-Passing Interface," copyright 1999, pp. 35-42, second edition, MIT Press.
Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.
"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL:http://www.maxell.co.jp/products/consumer/rabel_card/>.
Movie-PhotoPrint by Canon, [online] [Retrieved on Nov. 11, 2003]. Retrieved from the Internet<URL:http://cweb.canon.jp/hps/guide/rimless.html>.
PostScript Language Document Structuring Conventions Specification, Version 3.0 (Sep. 25, 1992), Adobe Systems Incorporated.
Print From Cellular Phone by Canon, [online] [Retrieved on Nov. 11, 2003]. Retrieved from the Internet<URL:http://cweb.canon.jp/bj/enjoy/pbean/index.html>.
Print Images Plus Barcode by Fuji Xerox, [online] [Retrieved on Nov. 11, 2003]. Retrieved from the Internet<URL: http://www.fujixerox.co.jp/soft/cardgear/release.html>.
Print Scan-Talk by Barcode by Epson, [online] [Retrieved on Nov. 11, 2003]. Retrieved from the Internet<URL:http://www.epson.co.jp/osirase/2000/000217.htm>.
"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.
"Tasty FotoArt" [online], date unknown, Tague Technologies, Inc., [retrieved on Mar. 8, 3005]. Retrieved from the Internet: <URL: http//www.tastyfotoart.com>.
Variety of Media In, Print Paper Out by Epson, [online] [Retrieved on Nov. 11, 2003]. Retrieved from the Internet<URL:http://www.i-love-epson.co.jp/products/spc/pma850/pma8503.htm>.
Dimitrova, N. et al., "Applications of Video-Content Analysis and Retrieval," IEEE Multimedia, Jul.-Sep. 2002, pp. 42-55.
European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.
Graham, J. et al., "A Paper-Based Interface for Video Browsing and Retrieval," ICME '03, Jul. 6-9, 2003, pp. 749-752, vol. 2.
Graham, J. et al., "Video Paper: A Paper-Based Interface for Skimming and Watching Video," ICCE '02, Jun. 18-20, 2002, pp. 214-215.
Klemmer, S.R. et al., "Books With Voices: Paper Transcripts as a Tangible Interface to Oral Histories," CHI Letters, Apr. 5-10, 2003, pp. 89-96, vol. 5, Issue 1.
Minami, K. et al., "Video Handling with Music and Speech Detection," IEEE Multimedia, Juy-Sep. 1998, pp. 17-25.
Shahraray, B. et al, "Automated Authoring of Hypermedia Documents of Video Programs," ACM Multimedia '95 Electronic Proceedings, San Francisco, CA, Nov. 5-9, 1995, pp. 1-12.
Shahraray, B. et al., "Pictorial Transcripts: Multimedia Processing Applied to Digital Library Creation," IEEE, 1997, pp. 581-586.
Japanese Office Action, Japanese Application No. JP2004-278356, Aug. 10, 2010, 4 pages.
Japanese Office Action, Japanese Application No. JP2004-1278347, Aug. 31, 2010, 2 pages.
United States Notice of Allowance, U.S. Appl. No. 10/814,842, Aug. 18, 2010, 8 pages.
United States Notice of Allowance, U.S. Appl. No. 10/814,944, Aug. 23, 2010, 10 pages.
United States Office Action, U.S. Appl. No. 12/334,303, Sep. 21, 2010, 47 pages.
United States Office Action, U.S. Appl. No. 10/813,846, Oct. 6, 2010, 29 pages.
Machine Translation of JP 10049761 by Mori et al., 9 pages.
Mulhern, P. et al., "Pivot Vector Space Approach for Audio-Video Mixing," IEEE Multimedia, Apr.-Jun. 2003, pp. 28-40, vol. 10, Issue 2.
Srinivasan, U. et al., "Multi-Modal Feature-Map: An Approach to Represent Digital Video Sequences," Visual '99, LNCS 1614, 1999, pp. 299-306, Springer-Verlag, Berlin, Germany.
United States Office Action, U.S. Appl. No. 10/814,844, Sep. 11, 2009, 23 pages.
European Communication, EP Application No. 04 255 847.8, Sep. 21, 2010, 6 pages.
Japanese Office Action, Japanese Patent Application No. 2004-278346, Jan. 18, 2011, 2 pages.

United States Office Action, U.S. Appl. No. 12/334,303, Mar. 10, 2011, 17 pages.
United States Office Action, U.S. Application No. 10/813,846, Apr. 1, 2011, 32 pages.
United States Office Action, U.S. Appl. No. 12/334,303, Aug. 5, 2011, 8 pages.
United States Notice of Allowance, U.S. Appl. No. 10/813,846, Sep. 16, 2011, 10 pages.
European Office Action, European Patent Application No. 04 255 839.5, Jun. 17, 2011, 5 pages.
Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.
ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.
Label Producer by Maxell, [online] [Retrieved on Nov. 11, 2003]. Retrieved from the Internet<URL: http://www.maxell.co.jp/products/consumer/rabel_card/>.
Movie-PhotoPrint by Canon, [online] [Retrieved on Nov. 11, 2003]. Retrieved from the Internet<URL: http://cweb.canon.jp/hps/guide/rimless.html>.
Print From Cellular Phone by Canon, [online] [Retrieved on Nov. 11, 2003]. Retrieved from the Internet<URL: http://cweb.canon.jp/bj/enjoy/pbeam/index.html>.
Print Images Plus Barcode by Fuji Xerox, [online] [Retrieved on Nov. 11, 2003]. Retrieved from the Internet<URL: http://www.fujixerox.co.jp/soft/cardgear/release.html>.
Print Scan-Talk by Barcode by Epson, [online] [Retrieved on Nov. 11, 2003]. Retrieved from the Internet<URL: http://www.epson.co.jp/osirase/2000/000217.htm>.
Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.
R200 ScanTalk [online] (date unknown). Retrieved from the Internet<URL: http://homepage2.nifty.com/vasolza/ScanTalk.htm>.
Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.
European Search Report, Application No. EP 04255847.8-1247/1526442, 4 pages.

* cited by examiner

1100

PROJECTOR/PRINTER FOR DISPLAYING OR PRINTING OF DOCUMENTS

CROSS-REFERENCES TO RELATED APPLICATIONS

This application is a continuation-in-part of the following U.S. Patent Applications, each of which is hereby incorporated by reference in its entirety: U.S. patent application Ser. No. 10/814,580, titled "Printer With Document-Triggered Processing," by Jonathan J. Hull, Kurt W. Piersol and Peter E. Hart, filed Mar. 30, 2004 now U.S. Pat. No. 7,440,126, and U.S. patent application Ser. No. 10/814,842, titled "Printer with Multimedia Server," by Jonathan J. Hull, Jamey Graham, Peter E. Hart, and Kurt W. Piersol, filed Mar. 30, 2004 now U.S. Pat. No. 7,864,352.

BACKGROUND OF THE INVENTION

1. Field of the Invention

The present invention relates generally to the field of generating images or documents from digital data. More specifically, the present invention relates generally to printers and projectors. Still more particularly, the present invention relates to a device capable of accepting a document or image data in multiple formats and outputting the document in multiple formats.

2. Description of the Related Art

Data projectors for use with portable computers are well known and have become commonplace in the home and business environments. A conventional projector 102 is shown in FIG. 1 and includes a memory 104, an image processing unit 106, a display controller 108, a system controller 110, a video decoder 114 and optics 116. The system controller 110 of the projector 102 receives raw video data 112 (like RGB data) and stores the data in the memory buffer 104. The memory buffer 104 is used to store the data in various formats before use by the video decoder 114, the image processing unit 106 and the display controller 108. Once stored in the memory buffer 104, the video decoder 114 converts the raw video data into a format that is understandable to the image processing unit 106. After conversion by the decoder 114, the video data is converted to pixel and color data by the image processing unit 106. Finally, the display controller 108 and optics 116 use the pixel and color data to generate an image in light output by the projector 102 and displayed on the screen 118.

However, there are shortcomings with such prior art projectors. One problem is that they are only able to receive data in limited number of formats. Another problem is that the computer, such as a laptop, must by physically coupled to the projector for use, and display only what is shown on the computer's display. Also, they generally do not have any ability to store multiple presentations and display them at user request and under user control. Finally, projectors are often limited to the display resolution of the computer providing the image for display even if the projector is capable of displaying the image at a higher resolution than can be output by the computer.

Like data projectors, printers are well known and have become ubiquitous. A conventional printer 202 is shown in FIG. 2 and includes an Input/Output (I/O) controller 204, a print engine 206, an image processing module 208, a system controller 210, a memory buffer 212 and a print encoder/decoder (Codec) 214. The I/O controller 204 receives and directs incoming raw print data 225 (i.e., a description of a document in a language understood by the printer such as PCL or PDL) to the system controller 210 for distribution and storage in the printer 202. The raw print data 225 is converted by the print codec 214 into print data and control signals that can be sent to and understood by the image processing module 208. The image processing module 208 renders the image as print data at a print element level to the print engine 206, which in turn generates the image on paper. The memory buffer 212 is available to store instructions, data and documents for use by the image processing module 208, the system controller 210, or the print Codec 214. For example, the memory buffer 212 allows the printer 202 to receive data faster than it can be printed such that documents can be queued on the printer for printing in first-in first-out (FIFO) order.

However, there are a number of problems with conventional printers. First, they like projectors must receive the information in one of a limited number of print languages. Second, they have not been combined with projectors for a multifunction output device, and finally cannot generate a printed document based on input in projector format.

Therefore, what is needed is a device capable of accepting a document or image data in multiple formats and outputting the document in multiple formats. Moreover, there is a need for such a system that overcomes the other problems noted above with both projectors and printers of the prior art.

SUMMARY OF THE INVENTION

The present invention satisfies the foregoing needs by providing a system capable of accepting a document or image data in different formats and outputting the document in any one of multiple formats. More specifically, the present invention is a combined projector/printer that can receive data in a printer format or a projector format, and then either generate a displayable image, a printed document or both. In a first embodiment, the projector system is capable of accepting a variety of input formats, including video, LAN, or parallel inputs, and displaying a projectable image of any of these inputs through the digital display of a digital projector. In the case that the input data is not in a video format but rather in a print format, the projector system is further capable of converting the print format data to image data and to render the image data on a digital display. The print format to image data conversion is provided by a unique coder/decoder (Codec). In another embodiment, the combined projector/printer system is capable of displaying an image, printing an image, or recording a presentation according to the needs of the user. Yet, another embodiment offers an option for storing a received image for later use and associating an image with a particular presentation by matching the name, slide number, and pointer position of the presentation. The present invention also includes a variety of methods for performing the functionality of the present invention including a "print-to-display" method.

DETAILED DESCRIPTION OF THE PREFERRED EMBODIMENTS

Figure 1:
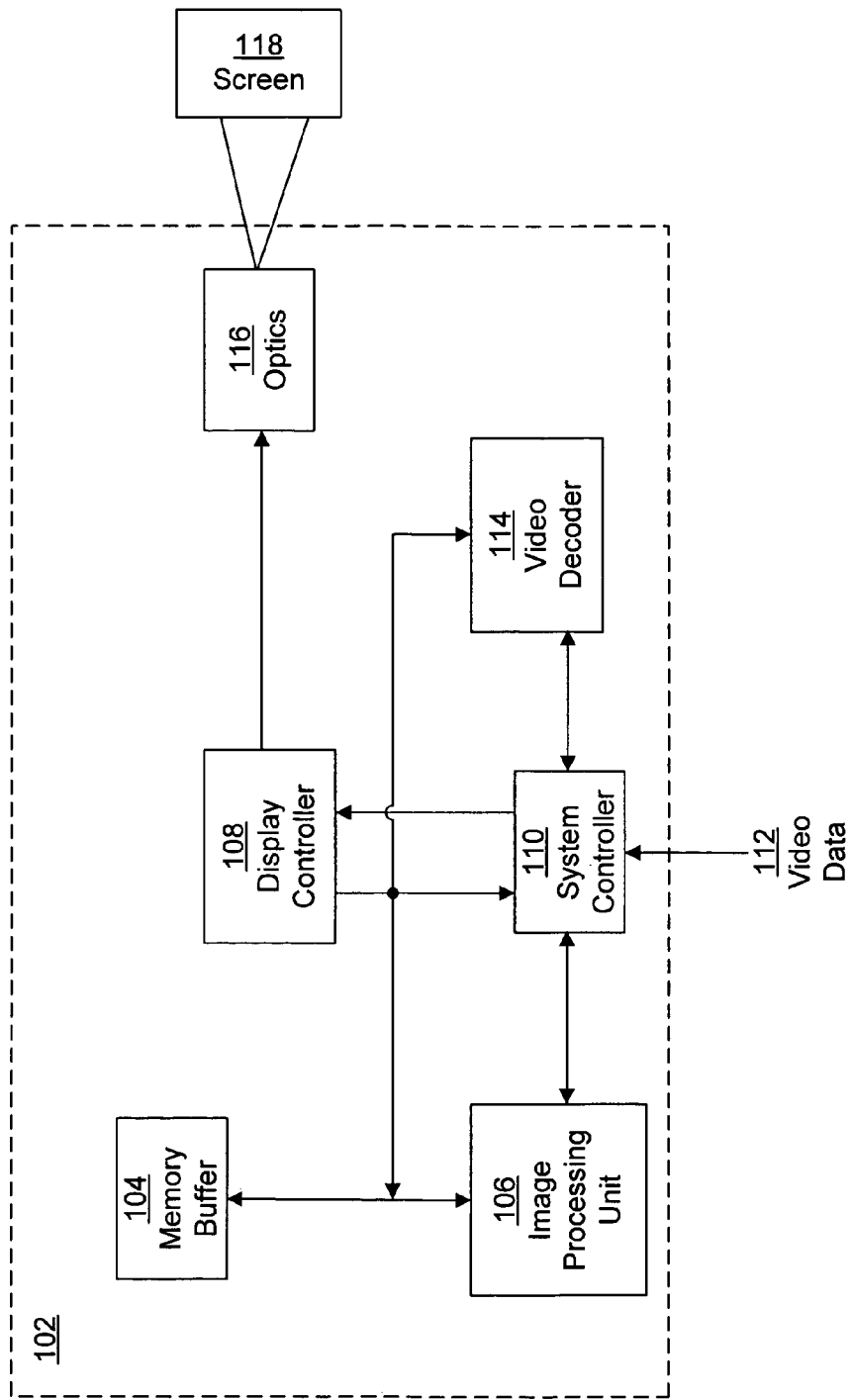
FIG. 1 is a block diagram of a conventional projector system.
Figure 2:
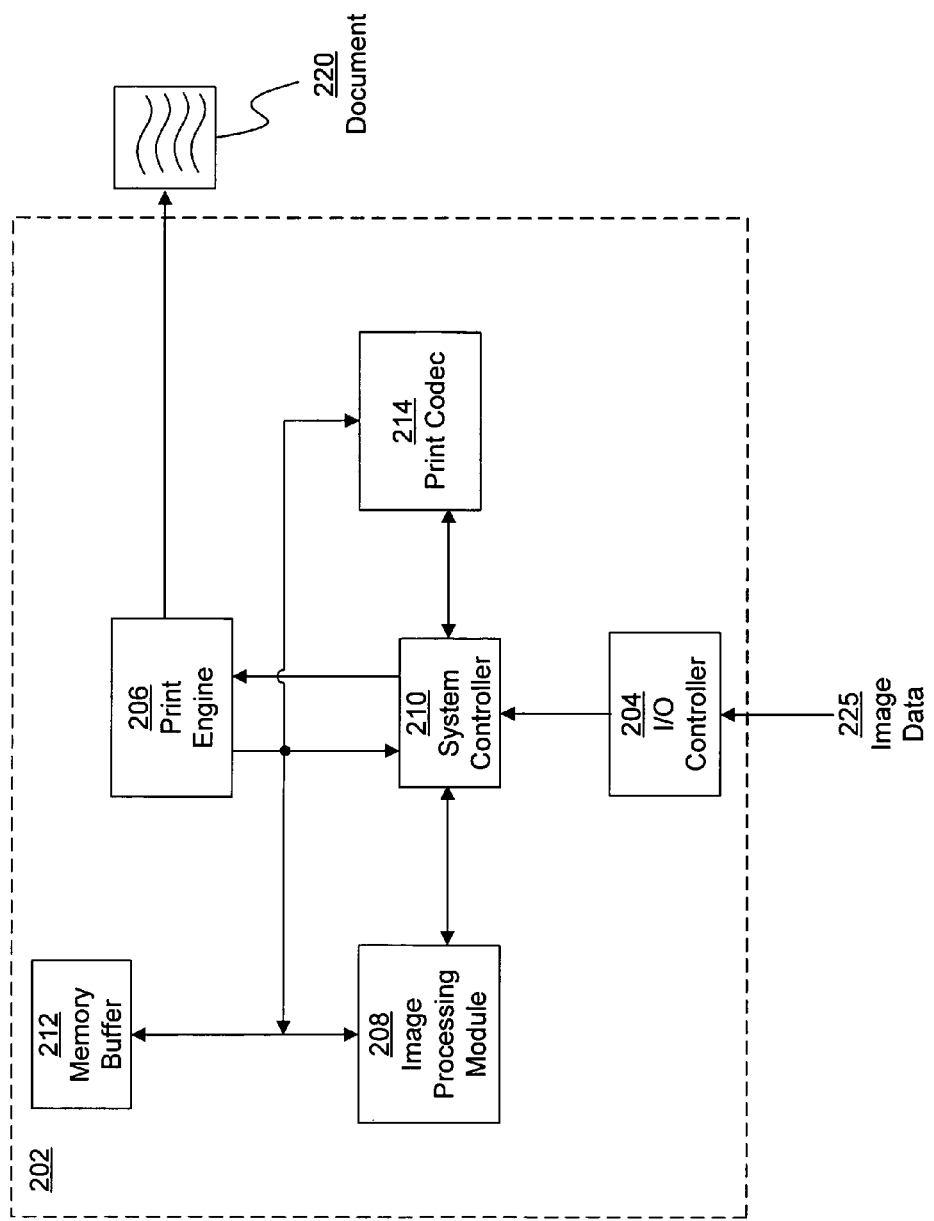
FIG. 2 is a block diagram of conventional printer system.
Figure 3:
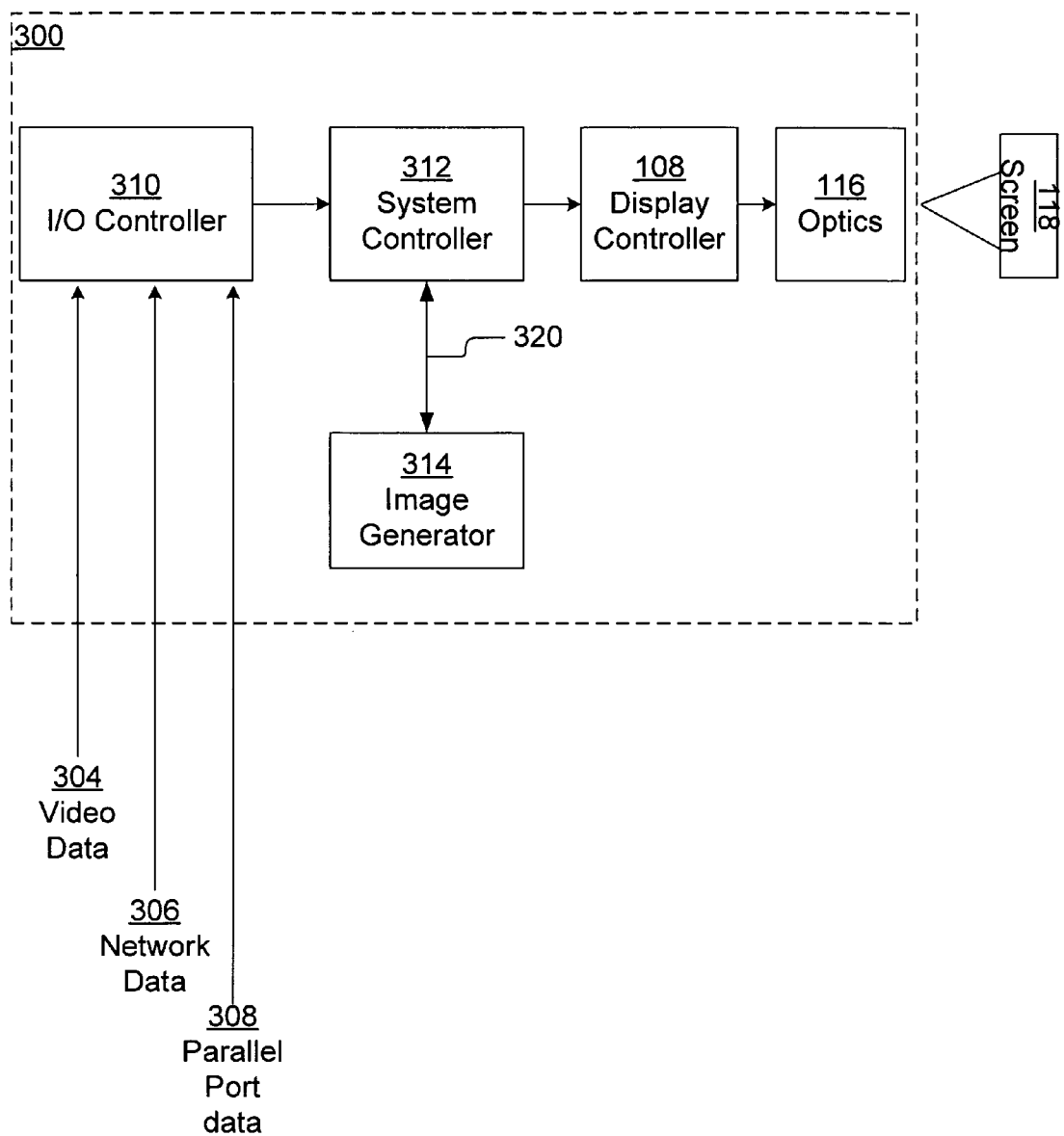
FIG. 3 is a block diagram of a projector system for displaying images produced from video data or print format data according to an embodiment of the present invention.

A digital projector 300 for displaying an image, in accordance with an embodiment of the present invention, is shown in FIG. 3. The digital projector 300 preferably comprises an I/O controller 310, a system controller 312, an image generator 314, a conventional display controller 108 and conventional optics 116. The novel I/O controller 310, system controller 312 and image generator 314 allow the digital projector 300 to generate displayable images from standard printer files or documents such as postscript or portable document format (PDF) files. The present invention provides a unique "print-to-display" action for sending a document to the digital projector 300 (the document in a format as it would be sent to a conventional printer); converting the document to an image format suitable for a digital projector; and generating a project-able image from the converted document.

The I/O controller 310 preferably has a variety of connectors such at a file can be sent to the digital projector 300 as parallel port data 308 from a direct parallel connection with a PC or media card; as network data 306 received over a local-area-network (LAN) coupled by a network connection, wired or wireless; or as video data 304 through a display connector like most conventional projector systems. Furthermore, a user can "print" a file to the digital projector system 300 over Bluetooth in yet another embodiment where the digital projector 300 includes a Bluetooth transceiver. I/O controller 310 supports a variety of data input formats through connection between a video input port, LAN input port, parallel input port, or any particular data port configured to accept any particular data format that a user chooses for display.

Once the particular data file is input to digital projector 300, by way of I/O controller 310, the data file is then sent to the system controller 312 where the system controller 312 determines whether the incoming data file is a compatible format for display by digital projector 300. In an embodiment, system controller 312 is adapted to control the flow of data within digital projector 300 by receiving input data in a variety of formats (including video or print data) and outputting data to the appropriate modules for processing, conversion, or storage. The system controller 312 is coupled by signal line 320 to the image generator 314 for conversion of the input file to a format such as pixel and color data that can be provided to the display controller 108 to produce an image. In one embodiment, I/O controller 310 accepts network input data 306 from a LAN port or parallel port data 308 in a standard printer language such as postscript, portable document format (PDF), or the like. A data file of this type is directed by system controller 312 to an image generator 314 for data conversion to a format conducive for display and for image processing. Image generator 314 receives the data file in a standard printer language and converts the file to a projectable format (like RGB or CYN data) that can be displayed through display controller 108 and optics 116.

In another embodiment, video data 304 enters the digital projector 300 from a video input port on I/O controller 310. The video data is then directed by I/O controller 310 to system controller 312 for analysis. At this point, system controller 312 determines that the video data 304 is in proper format for display and sends the data directly to controller 108 and optics 116 for display on screen 118.

Figure 4:
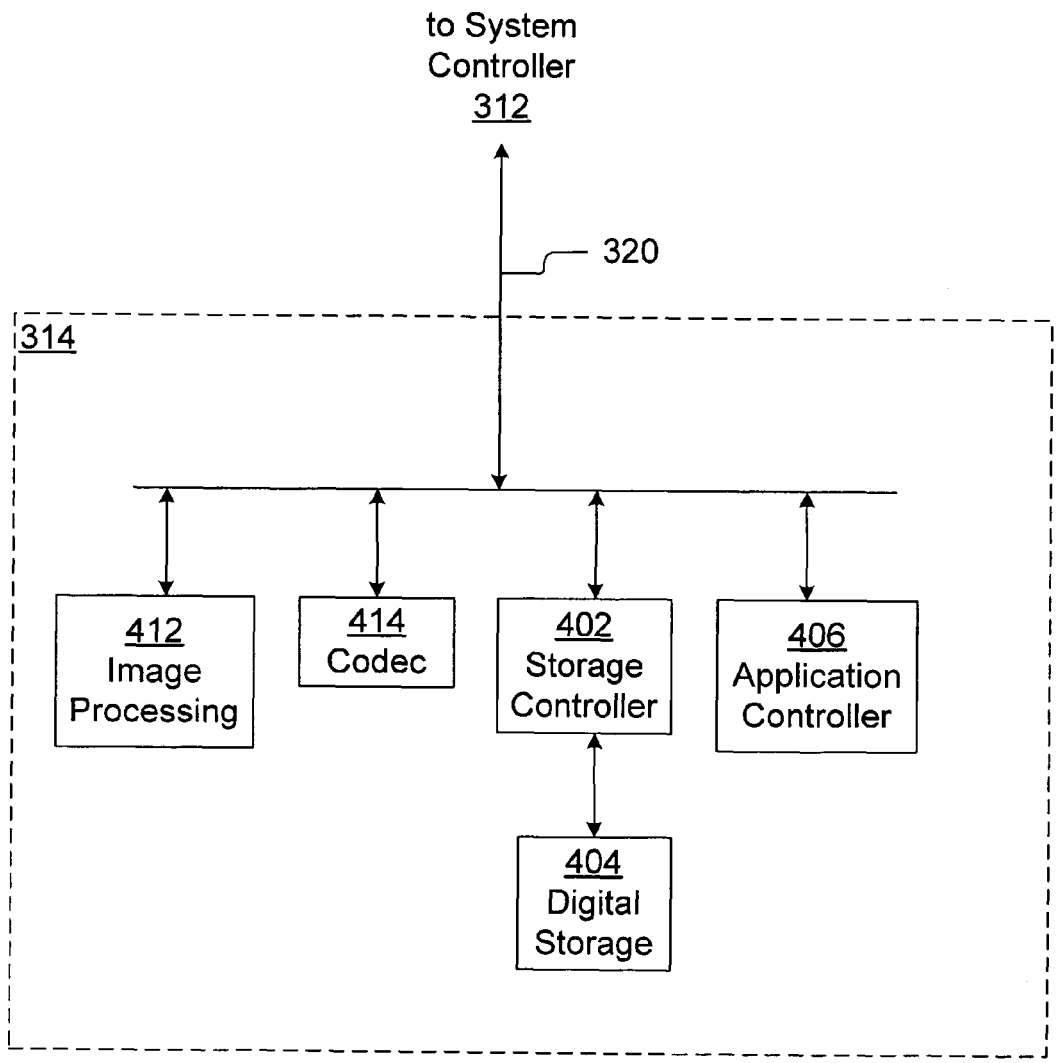
FIG. 4 is block diagram of an image generator capable for format conversion according to an embodiment of the present invention.

A more detailed view of an image generator 314, in accordance with an embodiment of the present invention, that supports rendering standard printer files, such as postscript or PDF, is shown in FIG. 4. The image generator 314 preferably includes an image processing module 412, a Codec 414, a storage controller 402, digital storage 404, and an application controller 406 coupled by signal line 320. The digital storage 404 is directly connected to the storage controller 402 which in turn is coupled to signal line 320. Depending on the type and format of the incoming data, the system controller 312 determines which of these components of the image generator 314 receive the incoming data. The image generator 314 of the present invention is advantageously able to receive an input file in a variety of different formats, and convert that input file into pixel and color data that can be sent to the display controller 108 to generate a displayable image. Different modules of the image generator 314 are used to manipulate the input file depending on its format.

In one embodiment, the image processing module 412 receives video data and converts that data to pixel and color data. The image processing module 412 is coupled to the signal line 320 and is capable of receiving data from the codec 414 or the digital storage 404 via the storage controller 402. The image processing unit also provides the pixel and color data to the display controller 108 via the system controller 312.

The storage controller 402 and digital storage 404 handle storage of input data, partially converted data, or processed pixel and color data. The storage controller 402 also orchestrates storage of multiple image files based on the order in which the I/O controller 310 receives the incoming data. Storage controller 402 accesses the temporary digital storage 404 to allow the digital projector 300 to receive data faster than it can be rendered, thus allowing the digital projector 300 and other devices coupled to it to perform other tasks while the display of images continues.

The codec has an input and an output coupled to line 320 to receive input data and output data. The codec is configurable and capable of performing compression, decompression, encoding and decoding signals. The codec is responsive to the application controller 406 and the system controller 312 as will be described in more detail below.

The application controller 406 is also coupled to line 320 for communication with the system controller 312, the codec 414, the image processing module 412 and the storage controller 402. The application controller 406 controls the storage and conversion of files from a print format into video data format. As will be described in more detail below, the application controller 406 controls the codec 414 including identifying what type of coding or decoding to use to convert an input print file to a video data format. Such conversion includes running applications necessary to translate and interpret the print file format.

In a first mode, the projector 300 operates in a conventional manner and video data is received at the I/O controller, and identified by the system controller 312 as such. The system controller 312 sends the video data to the image generator 314. At the direction of the system controller 312, the video data is first processed by the codec to modify the video data to the projector's display format, and then to the image processing unit 412 for processing in a conventional manner to generate pixel and color data. This pixel and color data in turn is provided to the display controller 108.

In a second mode, the system controller 312 identifies the input as a file in printer format. For example, this identification could be based on the port of the I/O controller that received the file. Alternatively, the identification could be from identification of the file format or header information. In this mode, the system controller 312 receives data in a printer format such as printer control language (PCL), PDF or PDL and it needs to be converted for display. The system controller 312 sends the printer format data to application controller 406 of the image generator 314 for appropriate data conversion. Application controller 406 sends translation instructions to codec 414 such that codec 414 can successfully carry out a printer format to video data conversion. The particular translation instructions sent from the application controller 406 to codec 414 depend on the exact form of the incoming printer format data. Different printer formats (i.e. postscript or PDF) have different translation instructions as will be recognized by those skilled in the art. During the conversion step, the incoming printer format data is converted to a data file suitable for further manipulation by the image processing module 412 to generate an image displayable by the digital projector 300. Typical data display formats include, but are not limited to RGB and CYN data. Once the print format data is converted successfully to a projectable format, the converted data is ready for processing and display.

Figure 6:
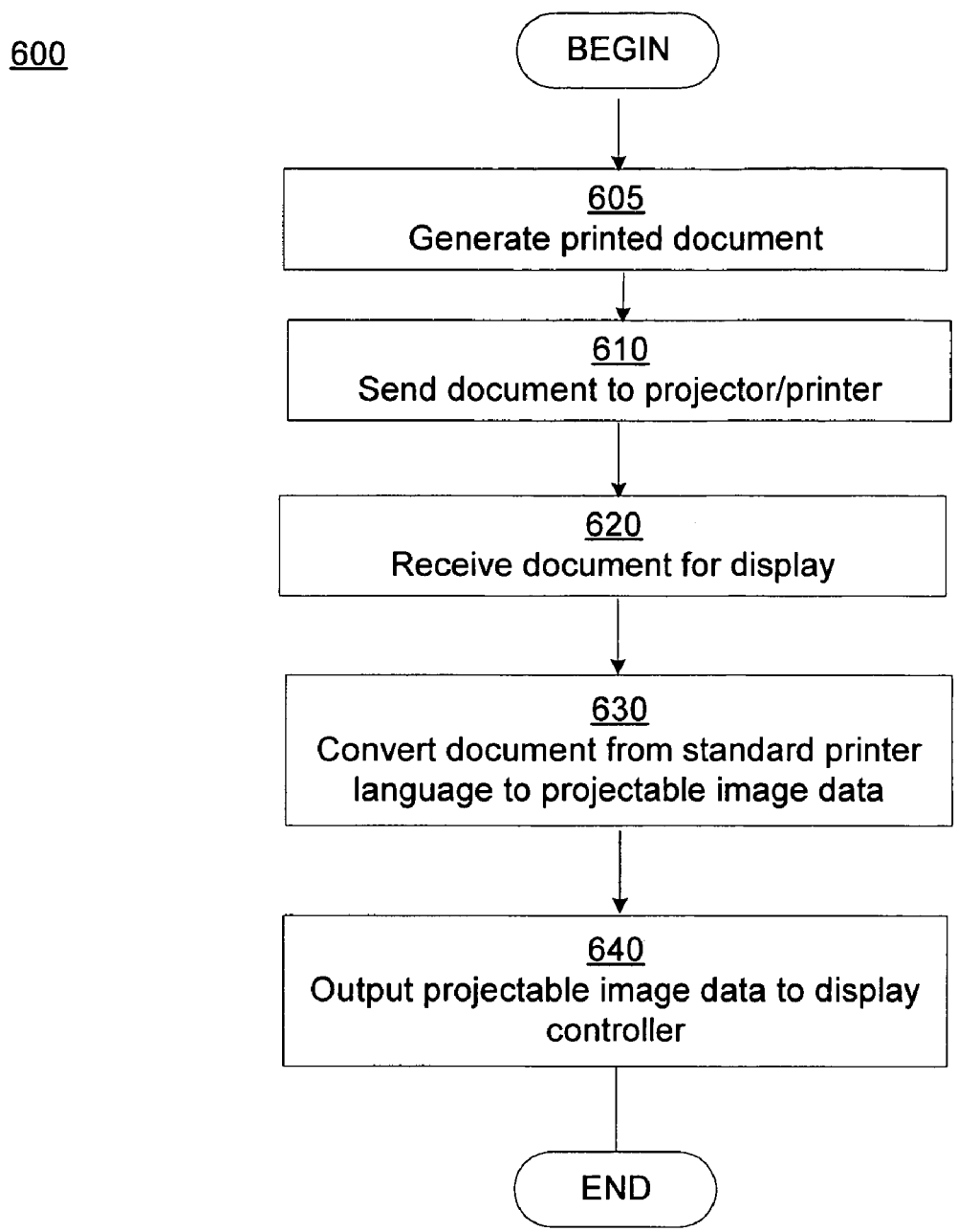
FIG. 6 is a flow diagram that illustrates a method for displaying a print format data in accordance with an embodiment of the present invention.

A method 600 for displaying a file in a printer format, in accordance with an embodiment of the present invention, is described in the flow diagram of FIG. 6. Initially, a file in a printer format is generated 605 and sent 610 to the projector 300 for display. The file in the printer format is received 620 by I/O controller 312. The projector 300 then converts 630 the file from standard printer language to projectable image data using the codec 414 within image generator 314. Finally, the projectable data is output 640 to display controller 108 and an image is generated and send through optics 116 for projection onto screen 118.

Figure 5:
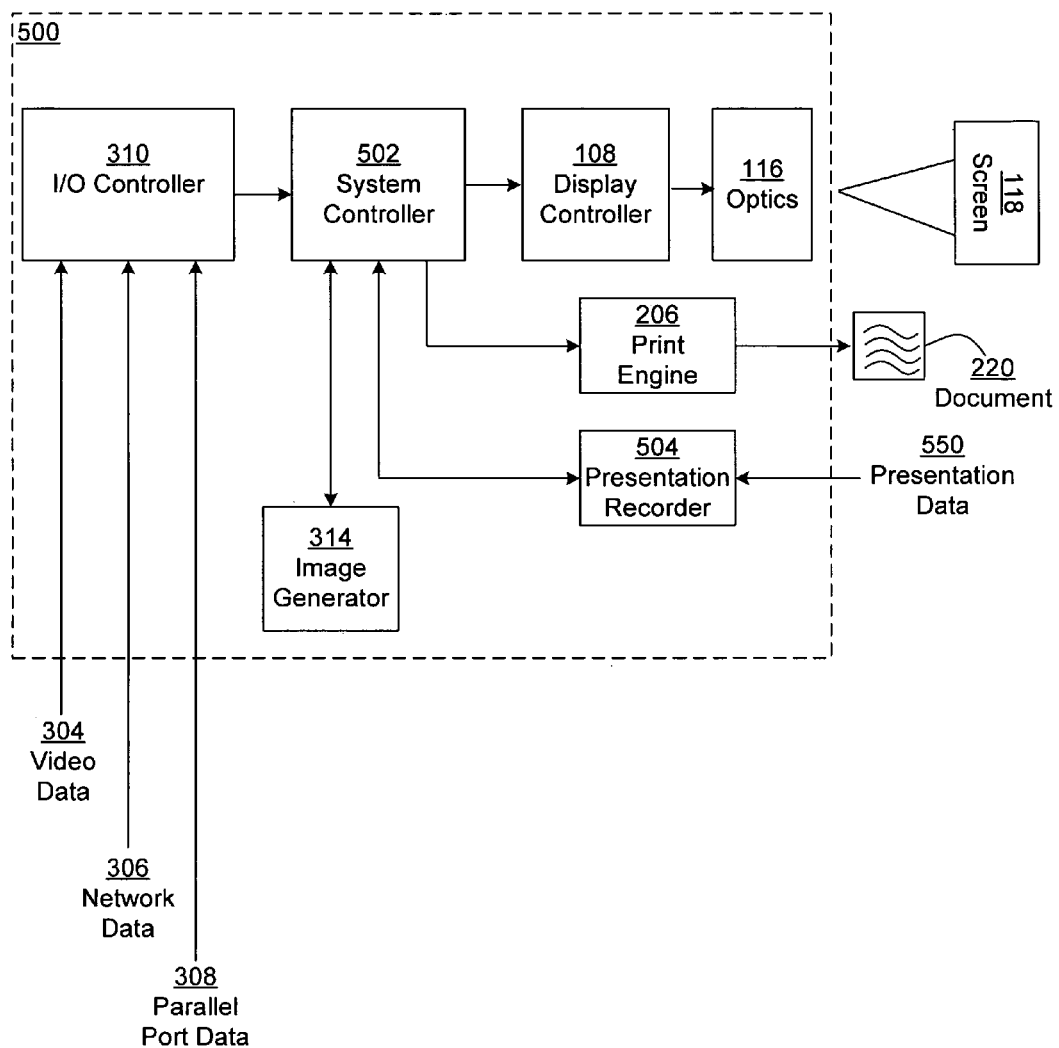
FIG. 5 is a block diagram of a projector/printer system according to an embodiment of the present invention.

A block diagram of an embodiment of a digital projector/printer 500 is shown in FIG. 5. The digital projector/printer 500 is capable of five major processes: 1) projecting a display of an incoming video data file; 2) projecting a display of an incoming print file; 3) printing an incoming print file; 4) printing an incoming video file; and/or 5) recording a presentation. The process for projecting an input file regardless of input format has been described above and similar structure and functionality are provided in the digital projector/printer 500 as has been described above for the projector 300. However, the operation of printing and recording require additional structure and functionality, and the processes will be described below.

As shown in FIG. 5, the digital projector/printer 500 preferably comprises an I/O controller 310, an image generator 314, a system controller 502, a display controller 108, optics 116, a print engine 206 and a presentation recorder 504. Some of the components of the digital projector/printer 500 have similar function and form as has been described above with reference to FIG. 3 so like reference numerals and terminology have been used to indicate similar functionality. For example, the I/O controller 310, the display controller 108, and the optics 116 are similar to that described above with reference to FIG. 3 so they will not be described here again.

The system controller 502 is similar to that described above, however, it includes the added functionality for the operations noted above, specifically: 1) projecting a display of an incoming video data file; 2) projecting a display of an incoming print file; 3) printing an incoming print file; 4) printing an incoming video file; and 5) recording a presentation. The system controller 502 is adapted to control the flow of data within digital projector/printer 500 by receiving input data in a variety of formats from the I/O controller 310 and sending the data as appropriate to the image generator 314, the presentation recorder 504, and the print engine 206 and the display controller 108. The system controller is coupled to send and receive data and control signals to the image generator 314 and the presentation recorder 504. The system controller 502 is coupled to send data and control signals to the print engine 206 and the display controller 108.

The print engine 206 can be any one of a conventional type, and using input and control signals from the system controller 502 generates a document 220 that may be printed text, drawings or images. The print engine 206 has an input coupled to the system controller 502 to receive data and commands. The system controller preferably provides the information and data in a format understood by the print engine such as PDL, PCL or other similar printer language.

The image generator 314 is similar to that described above, however, the image generator 314 for the projector/printer 500 embodiment of the present invention also includes functionality to output the file in print format to the print engine 206 for printing or a format suitable for the presentation recorder 504. The image generator 314 includes the image processing module 412, the Codec 414, the storage controller 402, the digital storage 404, and the application controller 406 coupled by signal line 320, as has been described above. Depending on the type and format of the incoming data, the system controller 502 determines which of these components of the image generator 314 receive the incoming data. The image generator 314 of the present invention is advantageously able to receive an input file in a variety of different formats, and convert that input file into pixel and color data that can be sent to the display controller 108 to generate a displayable image or convert the input file into control and print data that can be provided to the print engine 206 for generating a document. Different modules of the image generator 314 are used to manipulate the input file depending on its input format and the desired output.

In one mode, the image processing module 412 receives video data and converts that data to pixel and color data. In another mode, the image processing module 412 receives print data and converts it to data and control signals understood by the print engine 206. The image processing module 412 is coupled to the signal line 320 and is capable of receiving data from the codec 414 or the digital storage 404 via the storage controller 402. The image processing unit 412 is also coupled to the system controller 502.

The storage controller 402 and digital storage 404 handle storage of input data, partially converted data, or processed pixel and color data, or processed print and control data. The storage controller 402 is capable of storing multiple files based on the order in which the I/O controller 310 receives the incoming data. Storage controller 402 accesses the temporary digital storage 404 to allow the projector/printer 500 to receive data faster than it can be rendered, thus allowing it and other devices coupled to it to perform other tasks while the display or printing of images continues.

The codec has an input and an output coupled to line 320 to receive input data and output data. The codec is configurable and capable of performing compression, decompression, encoding and decoding signals. The codec is responsive to the application controller 406 and the system controller 502 as will be described in more detail below.

The application controller 406 is also coupled to line 320 for communication with the system controller 502, the codec 414, the image processing module 412 and the storage controller 402. The application controller 406 controls 1) the storage and conversion of files from a print format into video data format, 2) the storage and conversion of files from a video format into print format, and 3) conversion to and from a meeting recorder format. As will be described in more detail below, the application controller 406 controls the codec 414 including identifying what type of coding or decoding to use to convert an input file to a output data format, whether it be print or video format. Such conversion includes running applications necessary to translate and interpret the print and video file formats.

In an embodiment (process 5), projector/printer system 500 is equipped with a presentation recorder 504 for capturing presentation data 550. The presentation recorder 504 is part of a larger system for recording meeting and presentations. Presentation data 550, such as from cameras, microphones; and other capture devices as well as from a server (not shown) may be input to the presentation recorder of the projector/printer 500. This data under direction and control of the system controller 502 and input from the user may be displayed, printed or later recalled by the projector/printer 500. The system controller 502 may store a displayed image to the presentation recorder 504 as well for used in recording a meeting that used the projector/printer 500. An exemplary presentation recorder 504 that could be incorporated as part of the present invention is disclosed in U.S. patent application Ser. No. 09/728,560, filed Nov. 30, 2000, titled "Techniques for Capturing Information During Multimedia Presentations," by Jonathan Hull, Michael Baxter, Pamela Gage, Jamey Graham, Dar-Shyang Lee, and Peter Hart, which is incorporated by reference herein. The format of presentation data can include at least video, audio, or print media. Presentation recorder 504 allows a user to simultaneously project a presentation and also record the presentation for later use or editing. The video recording portion of presentation recorder also allows for recording of a completely interactive presentation through capture of audience reaction, feedback, or questioning. Also, in an embodiment, presentation recorder 550 is equipped with a digital scanner to receive incoming print media for editing and printing the print media.

Figure 7:
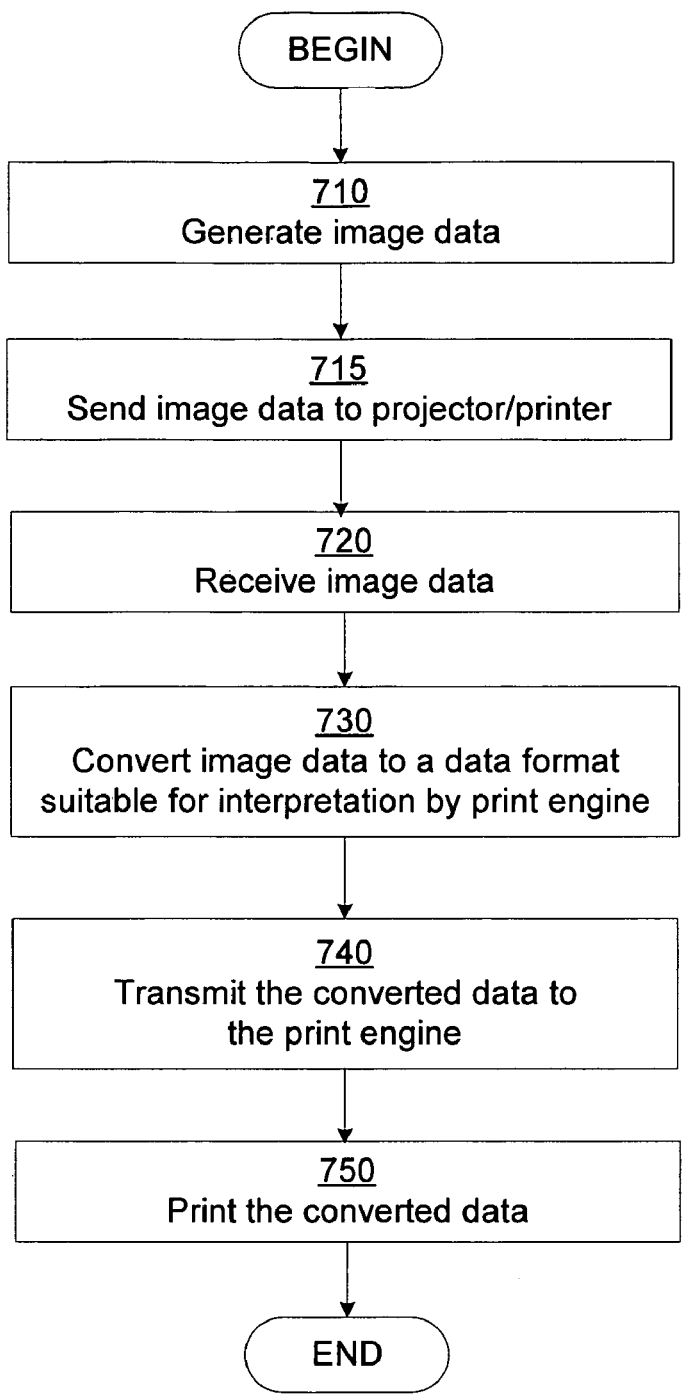
FIG. 7 is a flow diagram that illustrates a method for printing a video format data in accordance with an embodiment of the present invention.

Referring now to FIG. 7, a method 700 for printing a displayed image, in accordance with an embodiment of the present invention, is described. Initially, image data is generated 710 and sent 715 to the projector/printer 500 for printing. The image data is received 720 by I/O controller 312 and converted 730 by the system controller 502 and the image generator 314 from image data to a data format suitable for interpretation by print engine 206. The converted data is transmitted 740 to the print engine 206 by the system controller 502 and the converted data is printed 750 by the print engine 206 to generate the document 220.

In an embodiment (process 4) where the incoming data file to be printed is video data 304, system controller 502 directs the video data 304 to application controller 406 located within image generator 314 for appropriate data conversion. Application controller 406 sends translation instructions to codec 414 such that codec 414 can successfully carry out a video format data to print format data, such as PCL, conversion. The particular translation instructions sent from the application controller 406 to codec 414 depend on the exact form of the incoming video data 304. Different video data formats (i.e. RGB or CYN) have different translation instructions. During the conversion step, the incoming video data 304 is converted to a data file suitable for printing by print engine 206. Typical PCL formats include, but are not limited to postscript and PDF. Once the video data 304 is converted successfully to a printable format, the converted data is ready for processing and printing.

A method 800 for processing data by digital projector/printer system 500 is described in flow diagrams 8A-8H. Initially, data is received 805 at the I/O controller 312 and the I/O controller 312 directs the incoming data to system controller 502 to determine 810 what type of data has been received. If the input data is video data, the process continues in step 865 as shown in FIGS. 8A and 8F-H. If the input data is not video data, it is presumed to be print data, and the process continues in step 815 of FIG. 8B, as will be described with reference to FIGS. 8B-8E.

FIGS. 8A and 8F-H describe the method of the present invention for processing video data 304. If the system controller 502 determines 865 the command associated with the input data is the display command, the method transitions to step 866 of FIG. 8F. In step 866, the method sends the video data to the image generator for conversion. The method coverts 867 the video data to color and pixel data in a conventional manner similar to how projectors typically operate. The color and pixel data is provided 868 to the display controller 108, and the display controller 108 generates an image 869 that can be projected on to a screen, and the method is complete.

If the system controller 502 determines 865 the command associated with the input data is not the display command, the method continues in step 875 to determine whether the command associated with the data is the store for later use command. If so, the method stores 877 stores the data in system memory and the process is complete and ends. For example, the system controller 502 provides the video data 304 to storage controller 402 and digital storage 404 such that the video data 304 can be stored 877 in system memory for later use. If not, the method continues on to step 880.

In step 880, the method determines whether the command associated with the input data is the print video data command. If so, the method continues in step 882 of FIG. 8G. In step 882, the system controller 502 provides the video data 304 to the application controller 406 and the codec 414 to convert 882 the video data 304 to a data format suitable for interpretation by print engine 206. The system controller 502 then transmits 884 the converted data to the print engine 206 where the print engine 206 prints 886 the converted data into the document 220, and the method is complete.

If the command is not the print video data command in step 880, the method continues in step 890. In step 890, the system controller 502 determines whether the command associated with the input video data is the associate video data 304 with a presentation command. If so, the method continues in step 892 of FIG. 8H. In step 892, the system controller 502 next determines 892 which presentation is being recorded. The system controller 502 determines 894 the video data currently being displayed and creates 896 a copy of the current video data 304 such that the copy of the video data 304 is stored 898 in a data structure associated with the presentation that is recorded. To insure proper association between the video data and the presentation, the system controller 502 also stores 899 a time and context index to the presentation with the data structure. Once the storage is complete the process ends.

Figure 8A:
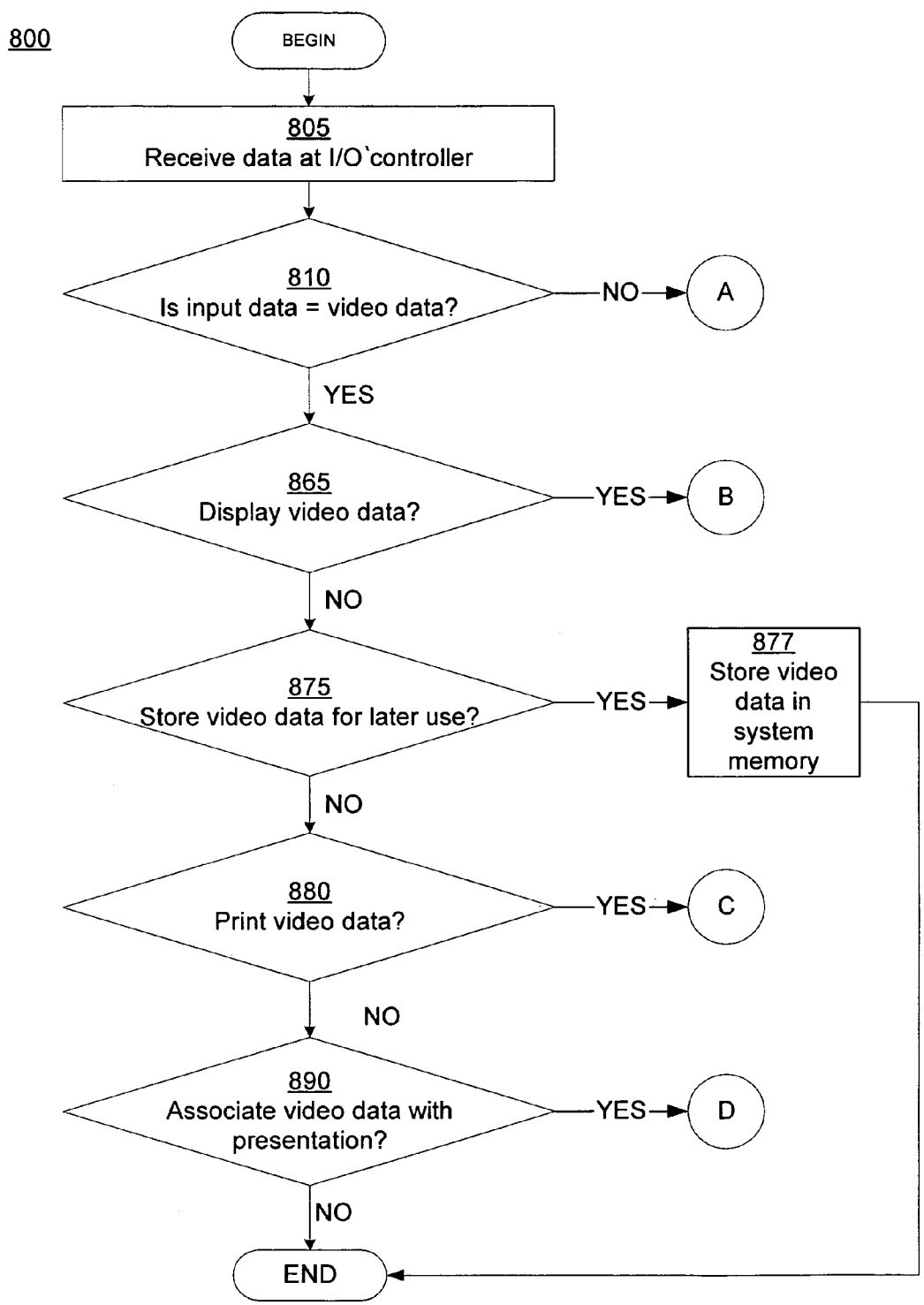
FIGS. 8A-8H are flow diagrams that illustrate a method for processing input data by a projector/printer in accordance with an embodiment of the present invention.
Figure 8B:
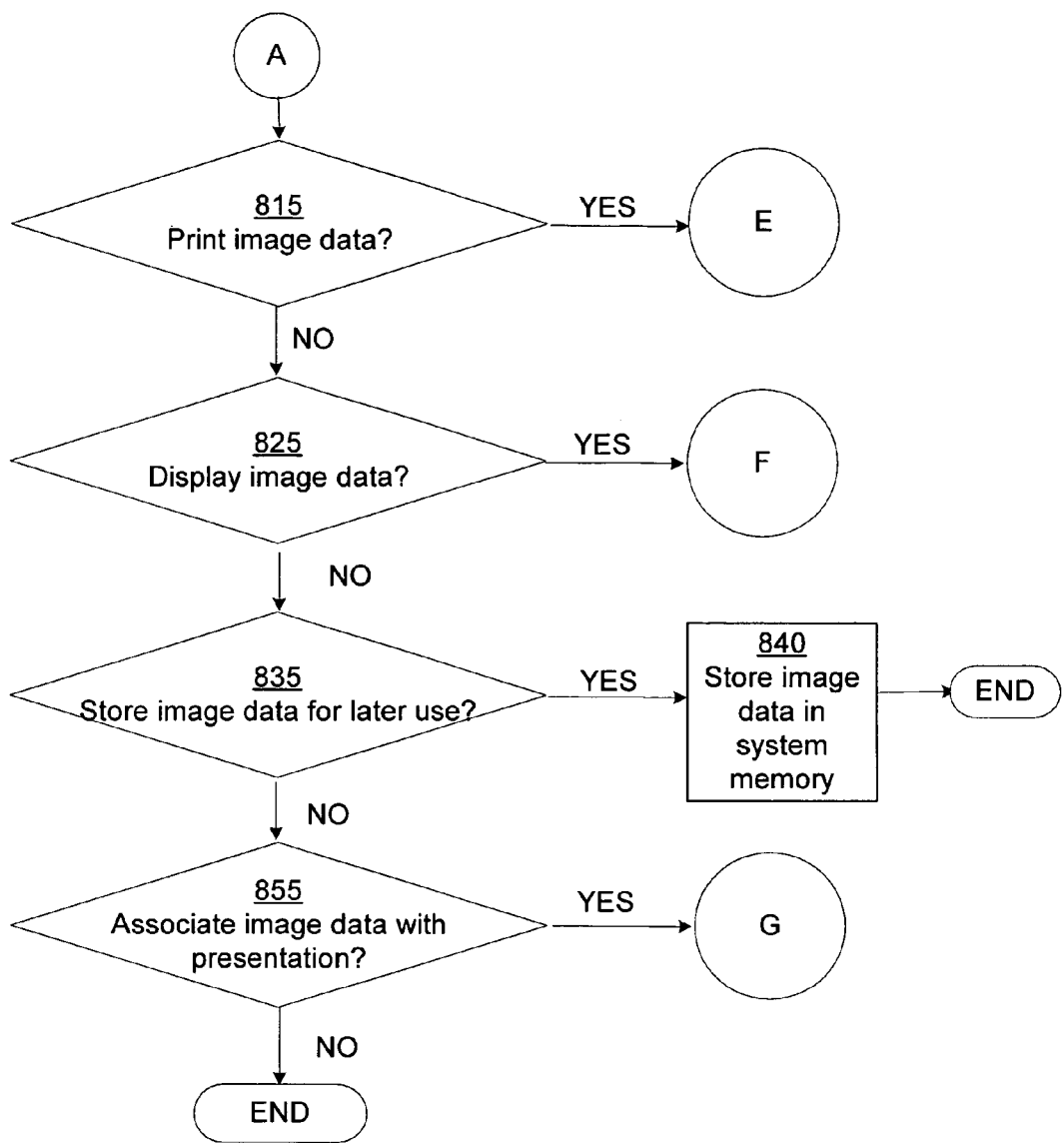
Figure 8C:
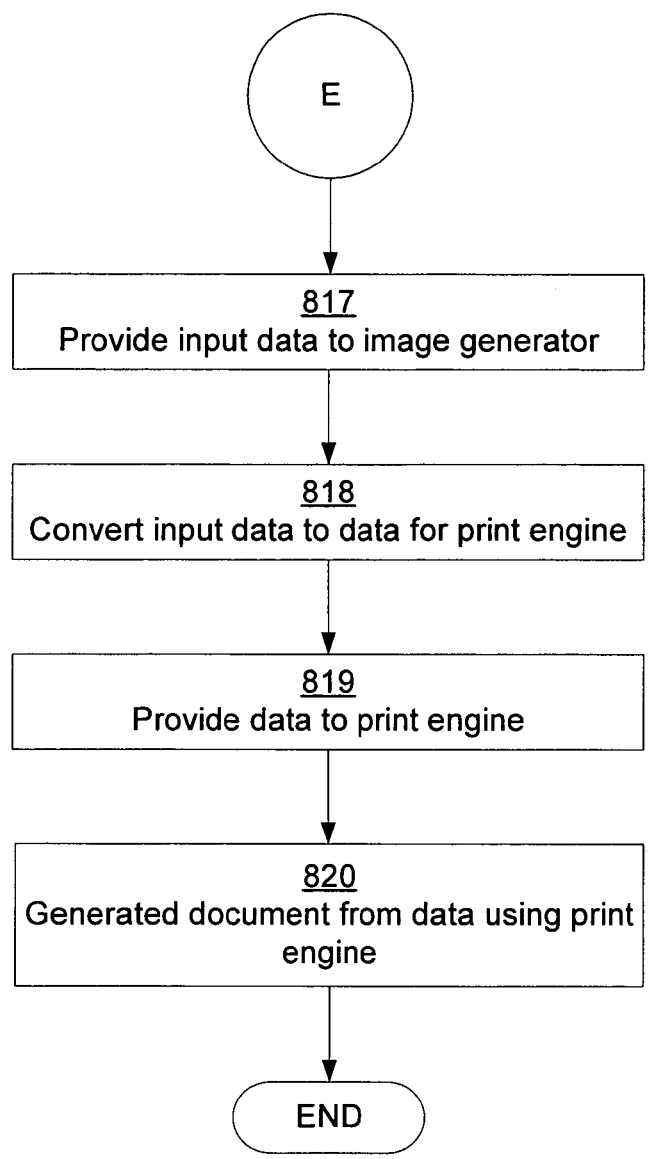
Figure 8D:
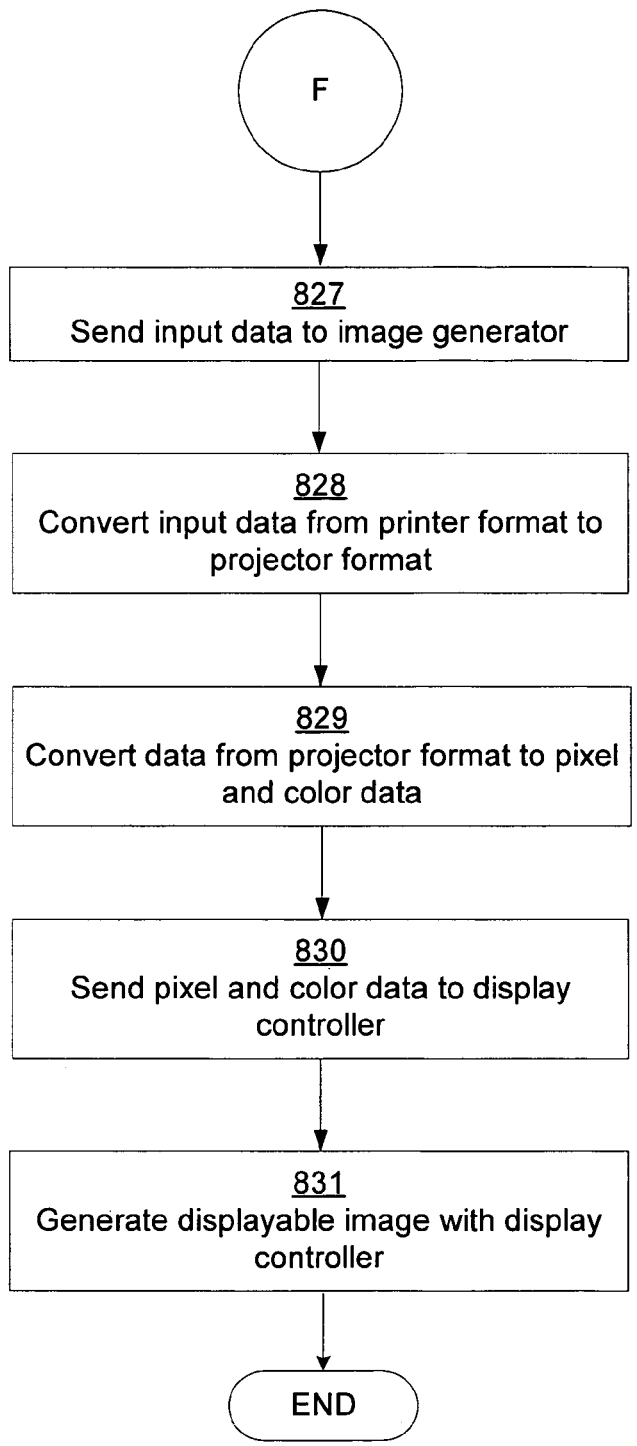
Figure 8E:
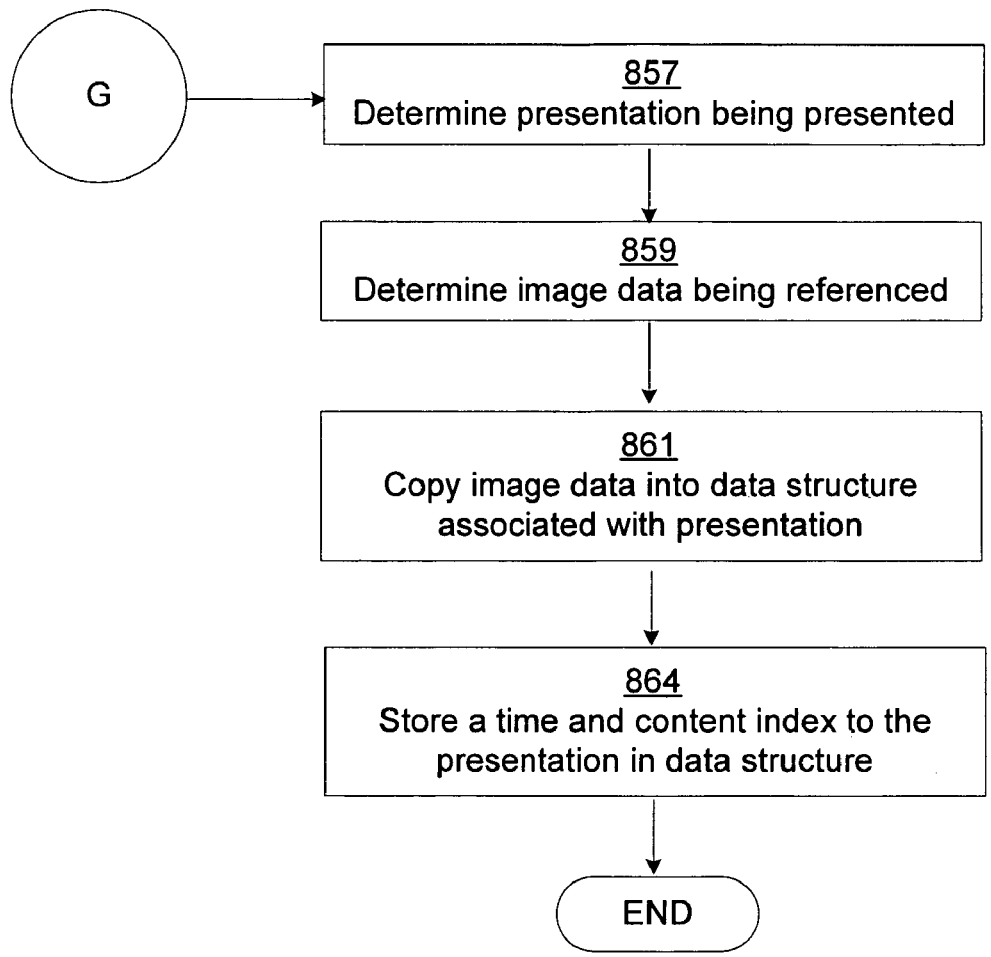
Figure 8F:
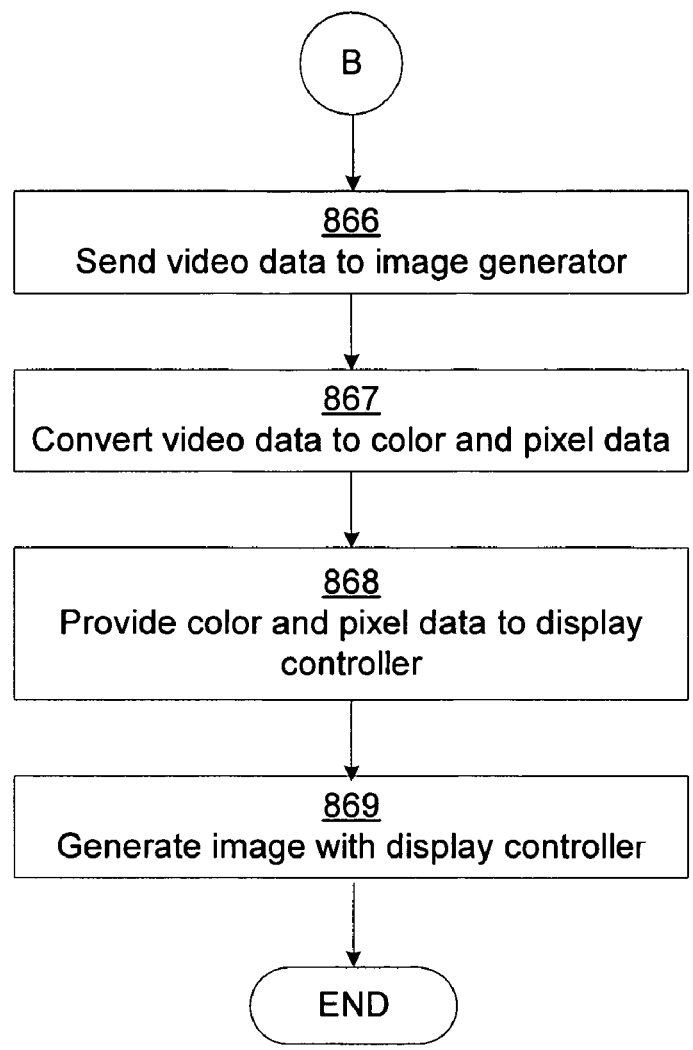
Figure 8G:
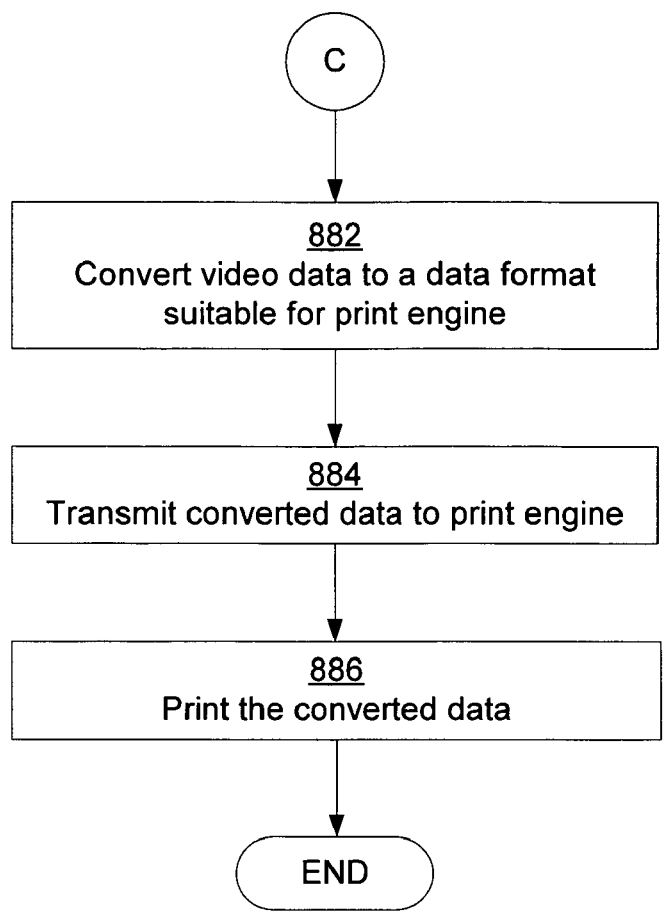
Figure 8H:
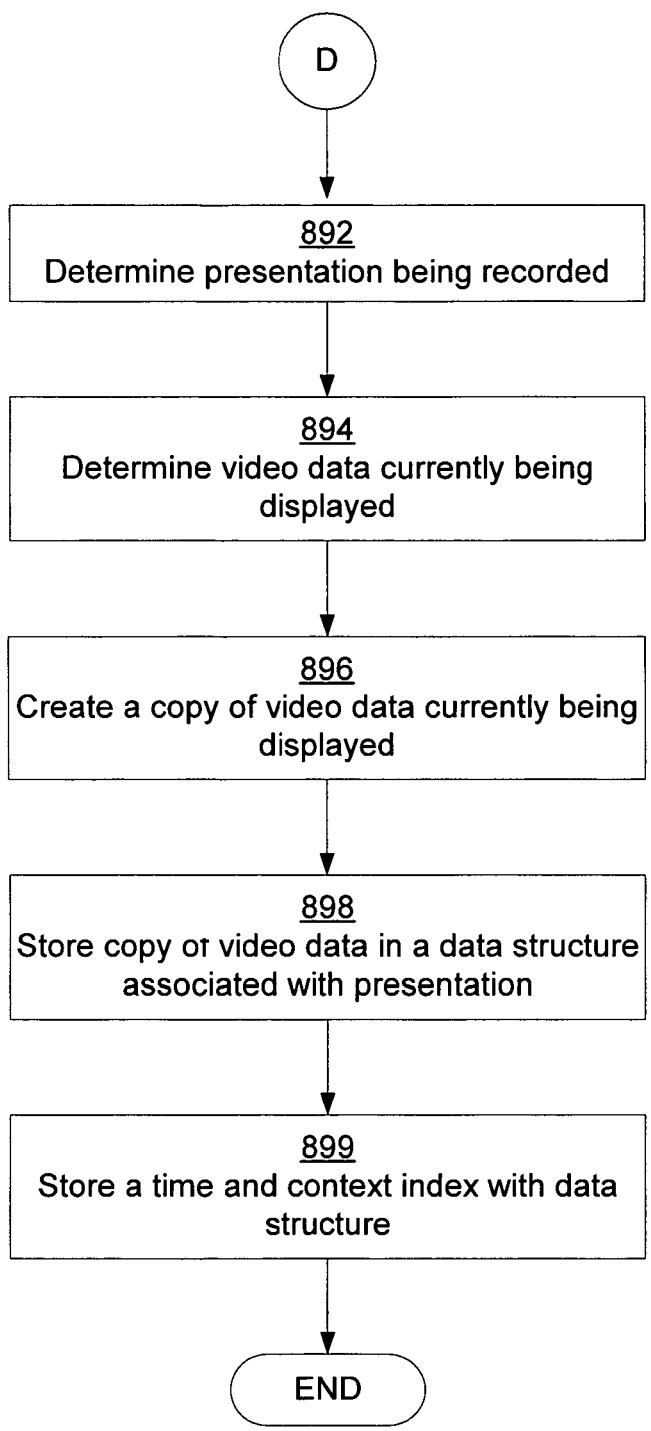

If in step 810 of FIG. 8A, the input data was determined not to be video data, the processes continues to step 815 of FIG. 8B. FIGS. 8B-8E are flow diagrams that describe modes for operating the present invention where the incoming data is determined 810 to be data in a printer format (i.e., network data 306, parallel port data 308, or any other data formatted for input to a printer). In step 815, the system controller 502 determines if a print command is associated with the input data/image data. If so, the method continues in step 817 of FIG. 8C. In step 817, the system controller 502 provides the input data to the image generator 314. The image generator 314 converts 818 the input data into a format usable by the print engine. Once converted, the system controller 502 provides 819 the converted data to the print engine 206 and the print engine 206 prints 820 the image data as document 220.

If in step 815, the system controller 502 determines the print command is not associated with the input data, then the method continues to step 825 of FIG. 8B to determine if the display command was associated with the input data. If so, the method continues in step 827 of FIG. 8D. In step 827, the method sends the input data to the image generator 314. In step 828, the system controller 502 instructs the application controller 406 and the codec 414 to convert 827 the image data from printer format to a projector format. Then the data is converted 829 from the projector format to color and pixel data. The color and pixel data is sent 830 to the display controller 108. The system controller 502 then instructs the display controller 108 to generate 831 a displayable image and output it through the optics 116 for display onto screen 118 before the method ends.

If in step 825, the system controller 502 determines the display command was not associated with the input data, the method continues to step 835 where the system controller 502 determines whether the command associated with the input data was to store image data for later use. If so, the system controller 502 provides the image data to storage controller 402 and digital storage 404 such that the image data can be stored 840 in system memory for later use.

If the command associated with the input data is not a storage command, the method continues in step 855. In step 855, the system controller 502 determines if the command was to associate the image data with a presentation. If not the method is completed. If so, the method continues to step 857 of FIG. 8E. In step 857, the system controller 502 next determines which presentation is being presented. The system controller 502 then determines 859 the particular image data currently being referenced and copies 861 the image data currently being referenced such that a copy of the image data is stored in a data structure associated with the presentation in the presentation recorder 504. To insure proper association between the image data and the presentation, the system controller 502 stores 864 a time and context index to the presentation in the data structure.

Figure 9:
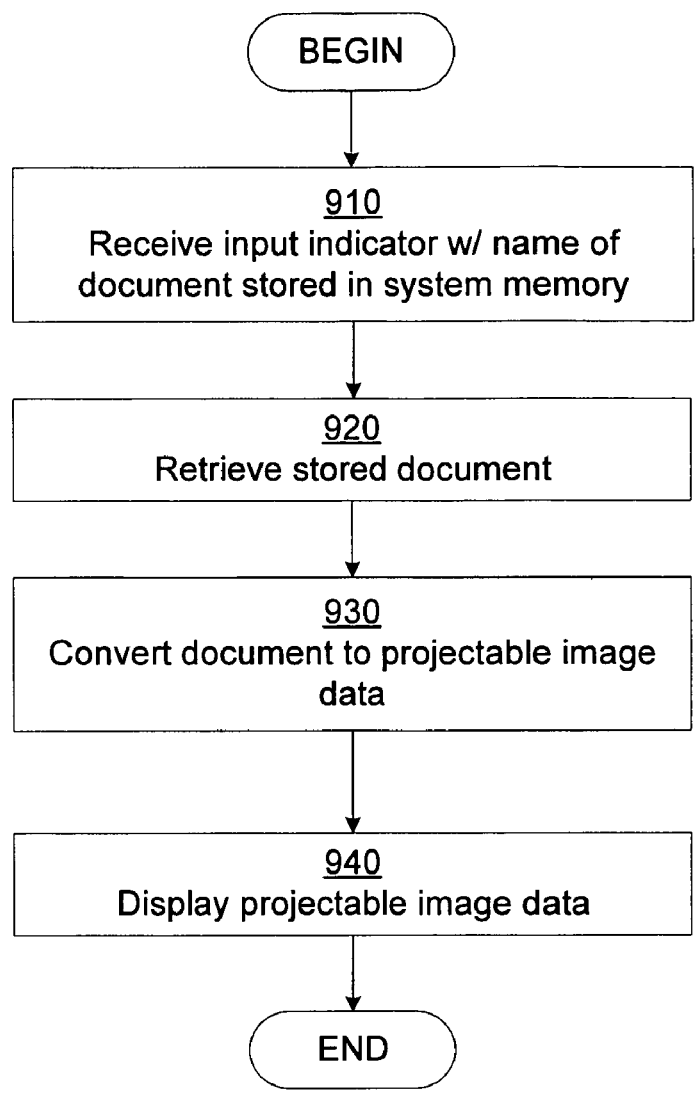
FIG. 9 is a flow diagram that illustrates a method for displaying a document stored in system memory in accordance with an embodiment of the present invention.

Another embodiment 900 of the present invention relates to retrieving a file stored within system memory of the projector/printer module 500 for display. FIG. 9 is a flow diagram of a method for displaying a file in printer format stored in system memory, such as by executing step 835, 840, 875 or 817 of FIG. 8. Initially, system controller 502 receives 910 an input indicator with the name of the file stored in digital storage 404. The system controller 502 then retrieves 920 the stored file and provides the file to the application controller 406 and the codec 414 to convert 930 the file into projectable image data. This can be done in a single conversion step or in multiple conversion steps as has been described above. The projectable image data is then provided to display controller 108 and optics 116 for display 940 onto screen 118.

Figure 10:
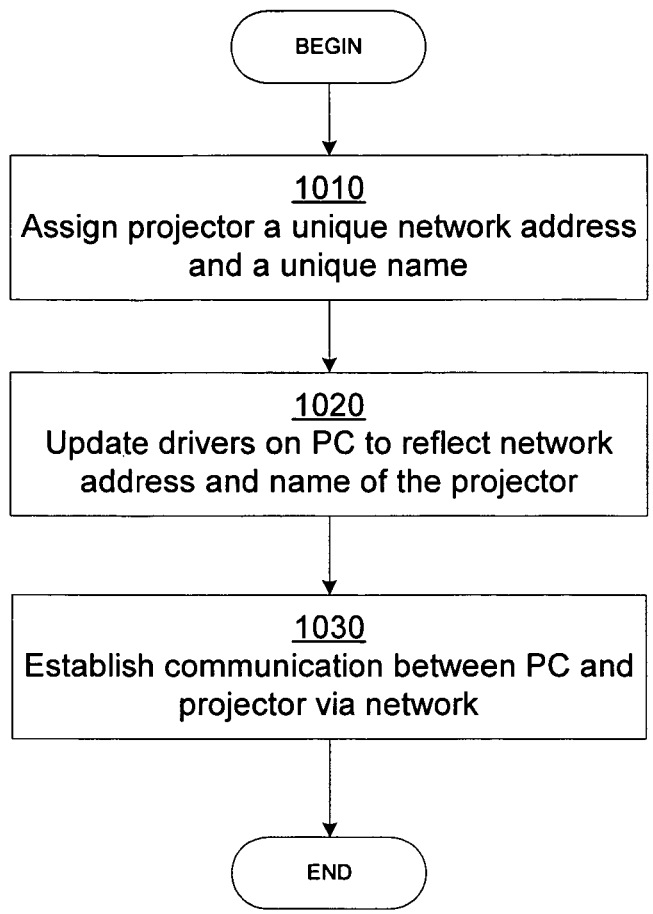
FIG. 10 is a flow diagram that illustrates a method for establishing communication between a PC and a projector via a network in accordance with an embodiment of the present invention.

In order for projector/printer 500 to communicate with a LAN to receive incoming data, in an embodiment, a network driver installs the projector/printer 500 as a network projector/printer with a property dialog box interface for specifying action taken by the projector/printer 500. In this embodiment, a user can select projector/printer 500 to receive a document via LAN input port 306 at I/O controller 310 for either display or printing, depending on the desires of the user or the requirements of a particular presentation. FIG. 10 is a flow diagram describing a method, according to an embodiment 1000, for installing projector/printer 500 as a network projector and printer. Initially, the projector/printer 500 is assigned 1010 a unique network address and a unique name. The drivers on a user's PC are updated 1020 to reflect the unique network address and name of the projector/printer 500. At this point, communication between the PC and the projector/printer 500 is established 1030 via a LAN.

Figure 11:
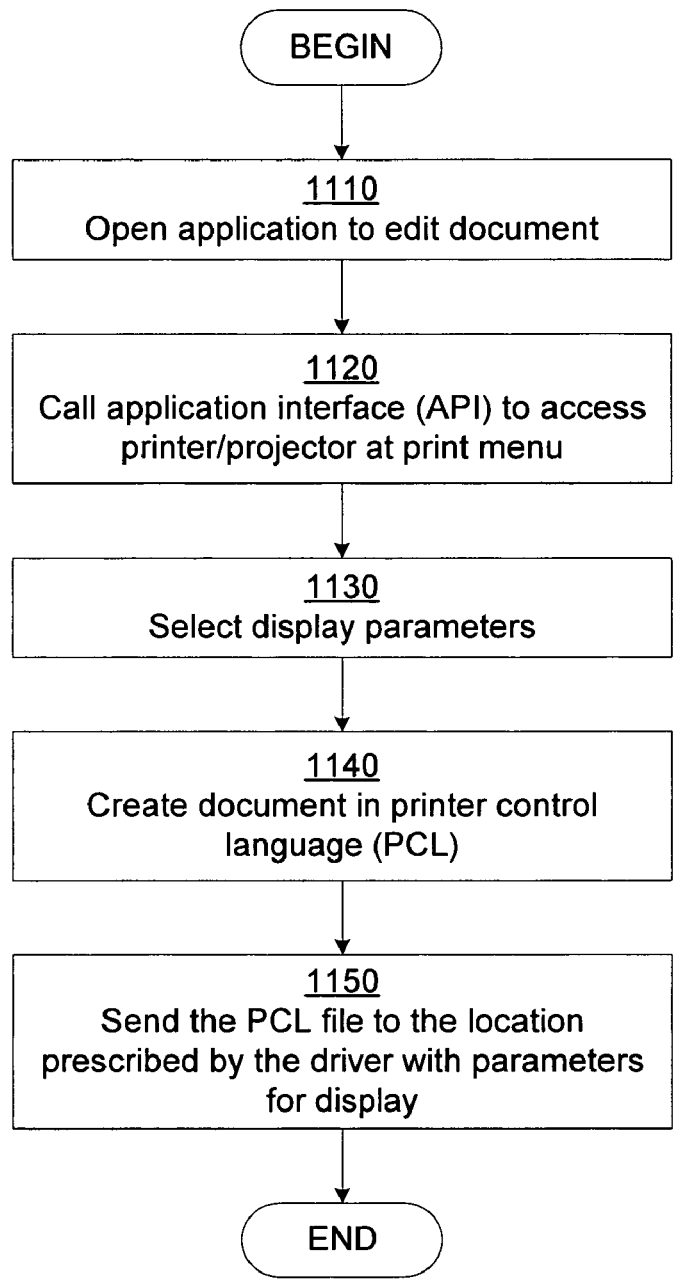
FIG. 11 is a flow diagram that illustrates a method for rendering a document in standard printer language for display, in accordance with an embodiment of the present invention.

Referring now to FIG. 11, a method for providing documents in a printer format to the projector/printer 500 of the present invention is shown. A method for generating a document in PCL and sending the PCL file to a projector/printer 500 for display is described in the flow diagram of FIG. 11, in accordance with a final embodiment 1100 of the present invention. Initially, a user runs 1110 an application and a document is edited. The application interface that uses the driver is called 1120 to access projector/printer 500 at the print menu of the application. Next the user selects 1130 the particular display parameters (i.e. resolution, color, etc.) for the display and a document is created 1140 in printer control language. The document is then sent 1150 to the addresses of the projector/printer 500 as prescribed by the network driver (FIG. 10) with the particular display parameters selected by the user for display by display controller 108 and optics 116.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE1394, Universal Serial Bus, or wireless networks such as IEEE 802.11 or IEEE 802.15 networks, in any combination. Variations upon and modifications to the preferred embodiments are provided for by the present invention, which is limited only by the following claims.

The invention claimed is:

1. An apparatus comprising:
    an input device having an input for receiving input data comprising an image, a video and audio data, the image and the video describing a presentation and the audio data describing user response to the presentation;
    a presentation recorder coupled to the input device, the presentation recorder for recording the presentation and the audio data associated with the presentation;
    a controller coupled to the input device and the presentation recorder, the controller for receiving the input data, for determining whether the input data is in a printer format or in a projectable image data format, for transmitting the input data to an image processing module or an application controller based on the determined input data and for associating the input data with the presentation by storing a copy of the input data in a data structure and storing a time and a context index to the presentation with the data structure;

a bi-directional converting device coupled to the controller, the bi-directional converting device comprising:
   the image processing module for responsive to receiving the input data in the printer format, converting the input data from the printer format to the projectable image data format that is suitable for display;
   the application controller for responsive to receiving video data, identifying a video format of the video data and determining translation instructions based on the video format; and
   a codec, coupled to the controller, for converting the video data to a printer format file based on the translation instructions;
a display controller, coupled to the bi-directional converting device and the controller, for generating and projecting image and video input data that are converted to the projectable image data format; and
a printing engine, coupled to the bi-directional converting device and the controller, for printing the printer format file.

2. The apparatus of claim 1, the input including a first input and a second input, the first input coupled to receive data formatted for a printer, the second input coupled to receive data formatted for a projector.

3. The apparatus of claim 1, further comprising a storage device, coupled to the controller, the storage device for storing image data.

4. The apparatus of claim 2, wherein the input device is an I/O controller capable of receiving the video data, network data, or parallel port data.

5. The apparatus of claim 1, wherein the presentation recorder includes a digital scanner for receiving incoming print media.

6. The apparatus of claim 1, wherein the video format of the video data is one from the group of RGB and CYN.

7. The apparatus of claim 1, wherein the display controller receives the video data and projects a display of the video data.

8. A computer-implemented method for providing an output based on input data using an apparatus, the method comprising the steps of:
   receiving input data at the apparatus, the input data comprising an image, a video and audio data, the image and the video describing a first presentation and the audio data describing user response to the first presentation;
   determining whether the input data is in a printer format or in a projectable image data format;
   recording the first presentation and the audio data associated with the first presentation;
   associating the input data with the first presentation by storing a copy of the input data in a first data structure and storing a first time and a first context index to the first presentation with the first data structure;
   responsive to the input data being in the printer format:
      converting the input data from the printer format to the projectable image data format; and
      generating and projecting output image and video from the converted input data that are in the projectable image data format;
   responsive to receiving video data:
      identifying a video format of the video data;
      determining translation instructions based on the video format;
      converting the video data to a printer format file based on the translation instructions; and
      printing the printer format file.

9. The method of claim 8, further comprising the step of storing the input data in a memory of the apparatus.

10. The method of claim 8, further comprising the steps of:
providing the video data to a display controller; and
projecting a display of the video data onto a screen.

11. The method of claim 8, further comprising the steps of:
determining a second presentation being recorded;
creating a copy of the video data currently being displayed;
storing the copy of the video data currently being displayed in a second data structure associated with the second presentation; and
storing a second time and a second context index with the second data structure such that the video data is associated with the second presentation.

12. The method of claim 8, further comprising the steps of:
assigning the apparatus a unique network address and a unique name;
updating drivers on a computing device to reflect the unique network address and name of the apparatus; and
establishing communication between the computing device and the apparatus via a network such that the input data may be printed or output by the projector.

13. The method of claim 12, further comprising the steps of:
opening an application to edit a document;
accessing the apparatus using a print menu by calling an application interface;
selecting display parameters;
creating a file for the document in the printer format; and
sending the file to the unique network address of the apparatus with parameters for display.

14. The method of claim 10, further comprising the step of storing the video data in memory for later use.

15. The method of claim 8 wherein the printer format is page description language or printer control language.

* * * * *